(12) United States Patent
Tachikawa et al.

(10) Patent No.: US 9,120,404 B2
(45) Date of Patent: Sep. 1, 2015

(54) CONVEYANCE SEAT

(75) Inventors: Yoichi Tachikawa, Tochigi (JP); Yusuke Ogata, Saitama (JP); Koki Sato, Saitama (JP); Nobuo Yokochi, Saitama (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 22 days.

(21) Appl. No.: 14/008,110

(22) PCT Filed: Mar. 29, 2012

(86) PCT No.: PCT/JP2012/058417
§ 371 (c)(1),
(2), (4) Date: Sep. 27, 2013

(87) PCT Pub. No.: WO2012/133676
PCT Pub. Date: Oct. 4, 2012

(65) Prior Publication Data
US 2014/0015288 A1    Jan. 16, 2014

(30) Foreign Application Priority Data

Mar. 31, 2011  (JP) ................................ 2011-081068

(51) Int. Cl.
*B60N 2/48*    (2006.01)
*B60N 2/30*    (2006.01)
(Continued)

(52) U.S. Cl.
CPC .............. *B60N 2/3088* (2013.01); *B60N 2/309* (2013.01); *B60N 2/3013* (2013.01);
(Continued)

(58) Field of Classification Search
CPC ........................... B60N 2/4855; B60N 2/4858
USPC ................................ 297/61, 336, 378.12, 408
See application file for complete search history.

(56) References Cited

U.S. PATENT DOCUMENTS 5,826,942 A * 10/1998 Sutton et al. ............. 297/378.12
6,860,564 B2 * 3/2005 Reed et al. .................... 297/408
(Continued)

FOREIGN PATENT DOCUMENTS

JP     62-17447 U    2/1987
JP     08-258603 A   10/1996
(Continued)

OTHER PUBLICATIONS

Extended European Search Report issued for EP 12763943.3 (Aug. 4, 2014).

*Primary Examiner* — Peter Brown
(74) *Attorney, Agent, or Firm* — Drinker Biddle & Reath LLP

(57) ABSTRACT

A conveyance seat is provided that includes: a folding mechanism that performs a folding operation for folding the headrest forward; a first receiving portion that receives a first operation when folding only the headrest forward; a second receiving portion that receives a second operation when storing the conveyance seat; a first driving portion that drives only the folding mechanism by the first operation received by the first receiving portion to permit the folding mechanism to perform the folding operation; and a second driving portion that drives the folding mechanism along with the movement of at least one of the seat cushion and the seatback to the storing position permitting the folding mechanism to perform the folding operation when the second receiving portion receives the second operation, wherein the folding mechanism, the first driving portion, and the second driving portion are all attached to the seatback frame provided inside the seatback.

5 Claims, 19 Drawing Sheets

(51) Int. Cl.
*B60N 2/36* (2006.01)
*B60N 2/68* (2006.01)
*B60N 2/44* (2006.01)

(52) U.S. Cl.
CPC .............. *B60N 2/3065* (2013.01); *B60N 2/36* (2013.01); *B60N 2/366* (2013.01); *B60N 2/4858* (2013.01); *B60N 2/68* (2013.01); *B60N 2002/445* (2013.01); *B60N 2002/4897* (2013.01)

(56) References Cited

U.S. PATENT DOCUMENTS

| | | | |
|---|---|---|---|
| 7,152,921 B2* | 12/2006 | Saberan | 297/336 |
| 7,258,400 B2* | 8/2007 | Yamada | 297/378.12 |
| 7,325,877 B2* | 2/2008 | Brockman et al. | 297/408 |
| 8,016,354 B2* | 9/2011 | Veluswamy et al. | 297/320 |
| 8,197,001 B2* | 6/2012 | Grable et al. | 297/61 |
| 8,662,578 B2* | 3/2014 | Szybisty et al. | 297/61 |
| 8,845,026 B2* | 9/2014 | Kobayashi et al. | 297/324 |
| 2007/0236069 A1 | 10/2007 | Chung | |
| 2009/0134683 A1* | 5/2009 | Furukawa et al. | 297/391 |
| 2010/0078972 A1 | 4/2010 | Sayama | |

FOREIGN PATENT DOCUMENTS

| | | |
|---|---|---|
| JP | 2007-302141 A | 11/2007 |
| JP | 2010-105655 A | 5/2010 |
| JP | 2011-011665 A | 1/2011 |
| WO | WO 2006/128290 A1 | 12/2006 |

* cited by examiner

CONVEYANCE SEAT

CROSS REFERENCE TO RELATED APPLICATIONS

This application is the U.S. national phase of the International Patent Application No. PCT/JP2012/058417, filed Mar. 29, 2012, which claims the benefit of the following Japanese Patent Application: Application No. 2011-081068, filed Mar. 31, 2011, the entire content being incorporated herein by reference.

BACKGROUND

Disclosed herein is a storable conveyance seat which includes a seat cushion, a seatback, and a headrest, and particularly, a conveyance seat which may fold a headrest forward along with a movement of at least one of a seat cushion and a seatback to a storing position and may fold only the headrest forward.

Storable conveyance seats each including a seat cushion, a seatback, and a headrest have been known. Among these conveyance seats, there are conveyance seats that may fold a headrest forward.

Then, among the conveyance seats that may fold the headrest forward, there is a conveyance seat in which the headrest folding operation may be performed not only directly at the headrest but also a remote position (for example, see Japanese Patent Document No. 2010-105655 A ("the '655 Document")). That is, in the conveyance seat disclosed in the '655 Document, two paths are provided which receive the forward headrest folding operation.

Further, among the conveyance seats that may fold the headrest forward, there is also a conveyance seat in which the headrest may be folded forward in accordance with the movement of the seat cushion or the seatback to the storing position (for example, see Japanese Patent Document No. 2011-011665 A ("the '665 Document")).

As a specification of the conveyance seat, there may be a demand in which the headrest is folded forward along with the movement of the seat cushion or the seatback to the storing position and the headrest is independently folded forward. It is also desirable to employ the conveyance seat in which the respective components of the seat may be easily combined or connected to each other and smoothly assembled.

In order to realize the above-described specification, for example, when the technique of Document '655 is applied to the conveyance seat of Document '665, there is a need to pull a transmitting member (specifically, a cable or the like), transmitting a driving force for driving a folding mechanism from the outside (of the headrest), into the headrest, since the folding mechanism for folding the headrest forward is provided inside the headrest in the technique of Document '655. For this reason, if the technique of Document '655 is applied to the case of performing the headrest folding operation along with the movement operation of the seat cushion or the seatback to the storing position, a length (hereinafter, a wiring length) in which the transmitting member is wired inside the seat is lengthened so that the assembling workability becomes insufficient.

SUMMARY

Therefore, the embodiments of the present invention are made in view of the above-described problem, and it is an object of embodiments of the present invention to realize a conveyance seat with further satisfactory assembling workability by performing a headrest folding operation along with a movement of a seat cushion or a seatback to a storing position or independently performing the headrest folding operation.

The above-described problem may be solved by a conveyance seat that comprises a seat cushion, a seatback including a seatback frame therein, and a forward foldable headrest and the seat back is stored by moving at least one of the seat cushion and the seatback to a storing position and folding the headrest forward, the conveyance seat further comprising: a folding mechanism that performs a folding operation for folding the headrest forward; a first receiving portion that receives a first operation performed by a passenger when folding only the headrest forward; a second receiving portion that receives a second operation performed by the passenger when storing the conveyance seat; a first driving portion that drives only the folding mechanism by the first operation received by the first receiving portion to permit the folding mechanism to perform the folding operation; and a second driving portion that drives the folding mechanism along with the movement of at least one of the seat cushion and the seatback to the storing position to permit the folding mechanism to perform the folding operation when the second receiving portion receives the second operation, wherein the folding mechanism, the first driving portion, and the second driving portion are all attached to the seatback frame.

According to such a configuration, since the folding mechanism, the first driving portion, and the second driving portion are all attached to the seatback frame, there is no need to pull the transmitting member into the headrest. Accordingly, the wiring length of the transmitting member may be further shortened. Accordingly, the forward folding operation of the headrest is performed along with the movement of the seat cushion or the seatback to the storing position or is independently performed. Thus, it is possible to provide the conveyance seat with further satisfactory assembling workability.

Further, there is provided the conveyance seat, wherein the folding mechanism may include a pillar that supports the headrest, a support portion that supports the pillar to be rotatable in the front to back direction, a biasing member that biases the pillar forward, a locking member that engages with the pillar to hold the pillar in a standing state against a biasing force of the biasing member, and a slide member that slides to release the engagement state between the locking member and the pillar, wherein the first driving portion may include a fastening portion that is formed in the slide member to fasten the first receiving portion and the slide member to each other, wherein a movement mechanism may be further provided which performs a movement operation for moving at least one of the seat cushion and the seatback to the storing position by the second operation received by the second receiving portion, wherein the second driving portion may include a connection portion that is formed in the slide member to connect the movement mechanism and the slide member to each other, and wherein the fastening portion may be located near the first receiving portion in relation to the connection portion.

According to the above-described configuration, since the positional relation between the first receiving portion and the slide member becomes appropriate in consideration of the operation of the first receiving portion influencing the slide member, it is possible to further improve the assembling workability.

Further, there is provided the conveyance seat further including a casing which accommodates the slide member, wherein a plate shaped pan frame and a pipe frame attached along the outer edge of the pan frame and located at the front side of the pan frame may be provided in the seatback frame, and wherein the casing may be attached to a front surface of the pan frame and may be located between a rear end of the pan frame and a front end of the pipe frame in the front to back direction of the seatback frame.

According to the above-described configuration, since the casing that accommodates the slide member falls between the rear end of the pan frame and the front end of the pipe frame, it is possible to realize a decrease in the size of the conveyance seat (particularly, the seatback).

Further, there is provided the conveyance seat, wherein the slide member may slide in the width direction of the seatback, wherein the first receiving portion may be a belt shaped member that extends from an upper end surface of the seatback, wherein the first operation may be a pulling operation that pulls the belt shaped member along the height direction of the seatback intersecting the width direction, wherein the first driving portion may include a converting portion that converts the pulling operation along the height direction into the sliding movement of the slide member along the width direction, and wherein the converting portion may be a bending member that is attached to the seatback frame and abuts against the belt shaped member to bend the belt shaped member.

According to the above-described configuration, it is possible to convert the belt shaped member pulling operation into the slide member sliding movement with a comparatively simple configuration.

Further, there is provided the conveyance seat, wherein the bending member may abut against the belt shaped member so that the belt shaped member is bent at the front side in relation to a front end of the pipe member in the front to back direction. According to such a configuration, since the contact between the belt shaped member and the pipe frame is suppressed, it is possible to prevent a difficulty in the pulling operation caused by the contact between the belt shaped member and the pipe frame.

Further, there is provided the conveyance seat, wherein the conveyance seat may be a vehicle seat mounted on a vehicle, and wherein the belt shaped member may extend from a portion in the upper end surface of the seatback located at the outside of the vehicle in relation to the headrest in the width direction. According to such a configuration, since the belt shaped member extends from a position which is easily seen by the passenger, the belt shaped member pulling operation is easily performed.

According to the conveyance seat of various embodiments, the headrest folding operation is performed along with the movement of the seat cushion or the seatback to the storing position and only the folding operation is performed. Thus, it is possible to provide the conveyance seat with further satisfactory assembling workability. It is possible to further improve the assembling workability, and to realize a decrease in size (particularly, a decrease in the size of the seatback).

It is further possible to convert the belt shaped member pulling operation into the slide member sliding movement with a comparatively simple configuration, and to prevent a difficulty in the pulling operation caused by the contact between the belt shaped member and the pipe frame. It is also possible to easily perform the belt shaped member pulling operation.

BRIEF DESCRIPTION OF THE DRAWINGS

The following diagrams illustrate various embodiments of the invention, described in more detail below.

FIG. 16 is a perspective view diagram illustrating a wiring space AS.

BRIEF DESCRIPTION OF THE DRAWINGS

Figure 1:
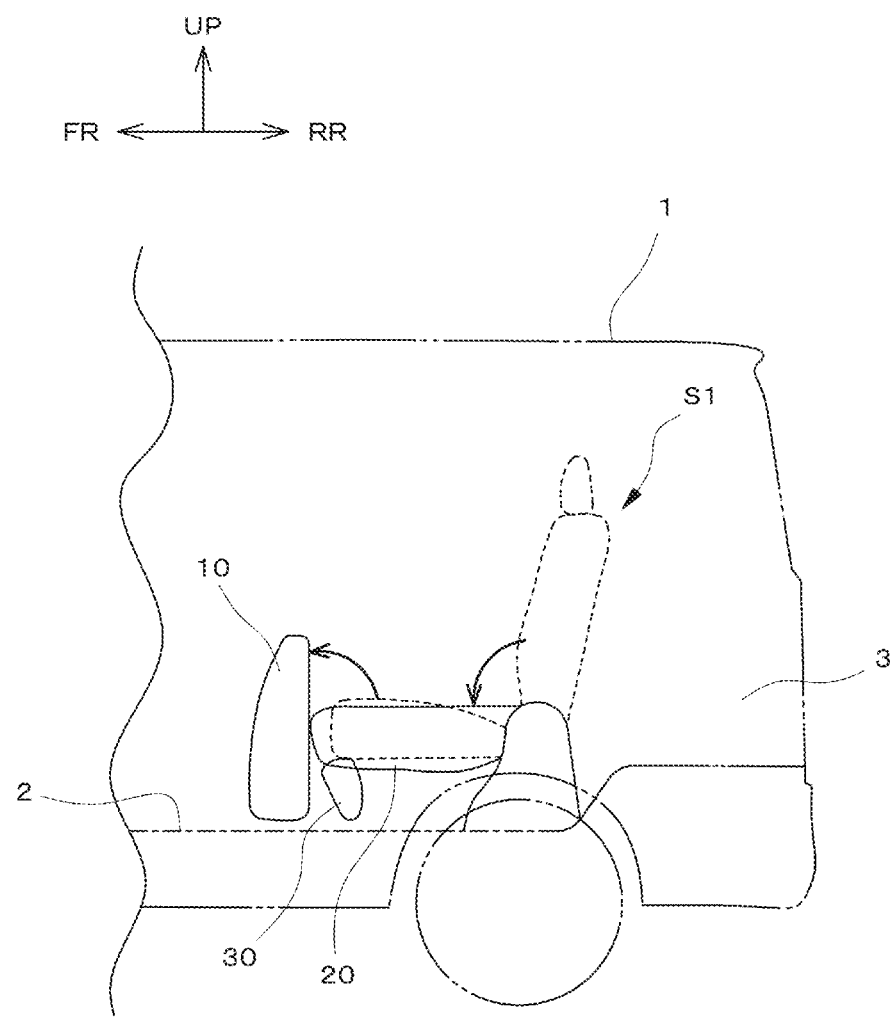
FIG. 1 is a schematic side view of a vehicle rear part equipped with a vehicle seat S1.

Hereinafter, an embodiment (hereinafter, this embodiment) according to the present invention will be described by referring to FIGS. 1 to 16.

FIGS. 1 to 16 illustrate a vehicle seat (hereinafter, a vehicle seat S1) according to this embodiment. The symbol FR in the drawings indicates the vehicle front side, the symbol RR indicates the vehicle rear side, and the symbol UP indicates the vehicle upside (or top side). Further, in the description below, the right and left direction indicates the right and left direction while the vehicle faces the front side, and matches the width direction of a seatback 20 to be described later. Further, the height direction of the seatback 20 indicates a direction intersecting the width direction, and the thickness direction of the seatback 20 indicates a direction matching the front to back direction of the seatback 20 (in other words, the front to back direction of a seatback frame 21 to be described later).

As illustrated in FIG. 1, the vehicle seat S1 is an example of a conveyance seat, and is mounted as a rear seat on the vehicle 1 which has a luggage compartment space at a rear part of a vehicle body of an automobile. Particularly, in this embodiment, the vehicle seat is mounted on a wagon type automobile.

Regarding the configuration of the vehicle seat S1, in this embodiment, the vehicle seat is divided into a right (driver seat side) vehicle seat S11 and a left (passenger seat side) vehicle seat S12, and each of the vehicle seats S11 and S12 includes a seat cushion 10, a seatback 20, and a headrest 30. Furthermore, an armrest 40 (FIG. 2) is disposed between the seatbacks 20 of the respective vehicle seats S11 and S12. In the left vehicle seat S12, the seatback 20 is integrated with a pedestal portion 20a located below the armrest 40 in FIG. 2, and the seat cushion 10 is integrated with a projection portion 10a disposed at the lower position of the pedestal portion 20a in FIG. 2.

The right vehicle seat S11 and the left vehicle seat S12 are different from each other in the above-described points, but both vehicle seats S11 and S12 have the same basic configurations. For this reason, in the description below, only the configuration of the right vehicle seat S11 will be described.

The vehicle seat S1 may switch its posture from a normal posture (which is a posture indicated by the dashed line in FIG. 1 and is referred to as a sitting posture later) in which a passenger may sit on the vehicle seat, to a posture (which is a posture indicated by the solid line in FIG. 1 and is referred to as a storing posture later) in which the seat is stored to form a luggage compartment part 3 in a non-use state. Specifically, the seat cushion 10 flips up toward the vehicle front side when changing the posture of the vehicle seat S1 to the storing posture. Further, the seat cushion 10 flips up and the seatback 20 rotates forward to be folded to a position where the seat cushion 10 that is not flipped up is disposed on the vehicle body floor 2. Further, when the headrest 30 rotates forward by about 90° from a state where the headrest is disposed above the seatback 20 in the substantially vertical direction so that the seatback 20 collapses onto the vehicle body floor 2, the headrest is stored between the seat cushion 10 that is flipped up forward and the folded seatback 20.

By the above-described series of operations (hereinafter, referred to as storing operations), the vehicle seat S1 is stored in a compact posture. Then, in the vehicle 1 which employs the vehicle seat S1 with the above-described configuration as the rear seat, the luggage compartment part 3, which constitutes a part of the vehicle body floor 2, is formed at the rear side of the vehicle seat S1, and the luggage compartment part 3 is widened to the usable size obtained by the storing operation of the vehicle seat S1.

As described above, the vehicle seat S1 is configured to switch its posture between the sitting posture and the storing posture. Further, in this embodiment, the posture may be switched so that only the headrest 30 is independently folded forward from the sitting posture or the posture may be switched so that only the seatback 20 is independently raised from the storing posture. These various kinds of seat arrangements are realized by various driving mechanisms (specifically, a headrest rotating mechanism 50, a seat cushion flip-up mechanism 60, a seatback folding mechanism 70, and the like to be described later) provided in the vehicle seat S1. Hereinafter, a configuration for realizing the seat arrangements of the vehicle seat S1 will be described.

Furthermore, in the description below, the sitting positions of the seat cushion 10, the seatback 20, and the headrest 30 indicate the positions of the seat cushion 10, the seatback 20, and the headrest 30 when the posture of the vehicle seat S1 is held in the sitting posture.

Further, the flip-up position of the seat cushion 10 indicates the position of the seat cushion 10 when the posture of the vehicle seat S1 is maintained in the storing posture, and corresponds to the storing position of the seat cushion 10. The folding position of the seatback 20 indicates the position of the seatback 20 when the posture of the vehicle seat S1 is maintained in the storing posture, and corresponds to the storing position of the seatback 20. The folding position of the headrest 30 indicates the position of the headrest 30 when the posture of the vehicle seat S1 is maintained in the storing posture.

Basic Configuration of Vehicle Seat S1

In order to describe the configuration for realizing the seat arrangements of the vehicle seat S1, the basic configuration of the vehicle seat S1 will be described. As described above, the vehicle seat S1 includes the seat cushion 10, the seatback 20, and the headrest 30.

Figure 3:
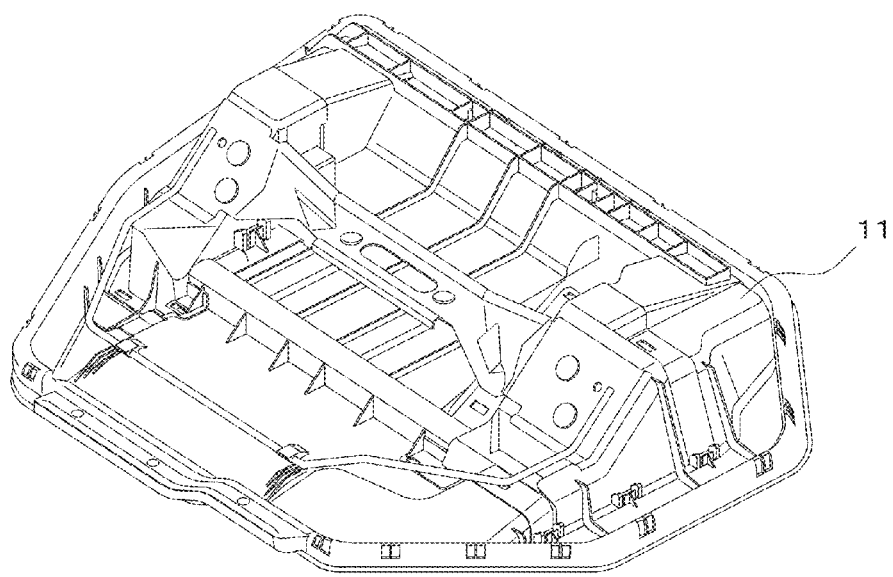
FIG. 3 is a perspective view of a cushion frame 11.

The seat cushion 10 is formed by attaching a surface material to a cushion frame 11 illustrated in FIG. 3. The attachment of the surface material is obtained by locking a trim cord (not illustrated) sewn to the end of the surface material to the outer edge of the cushion frame 11.

Figure 4:
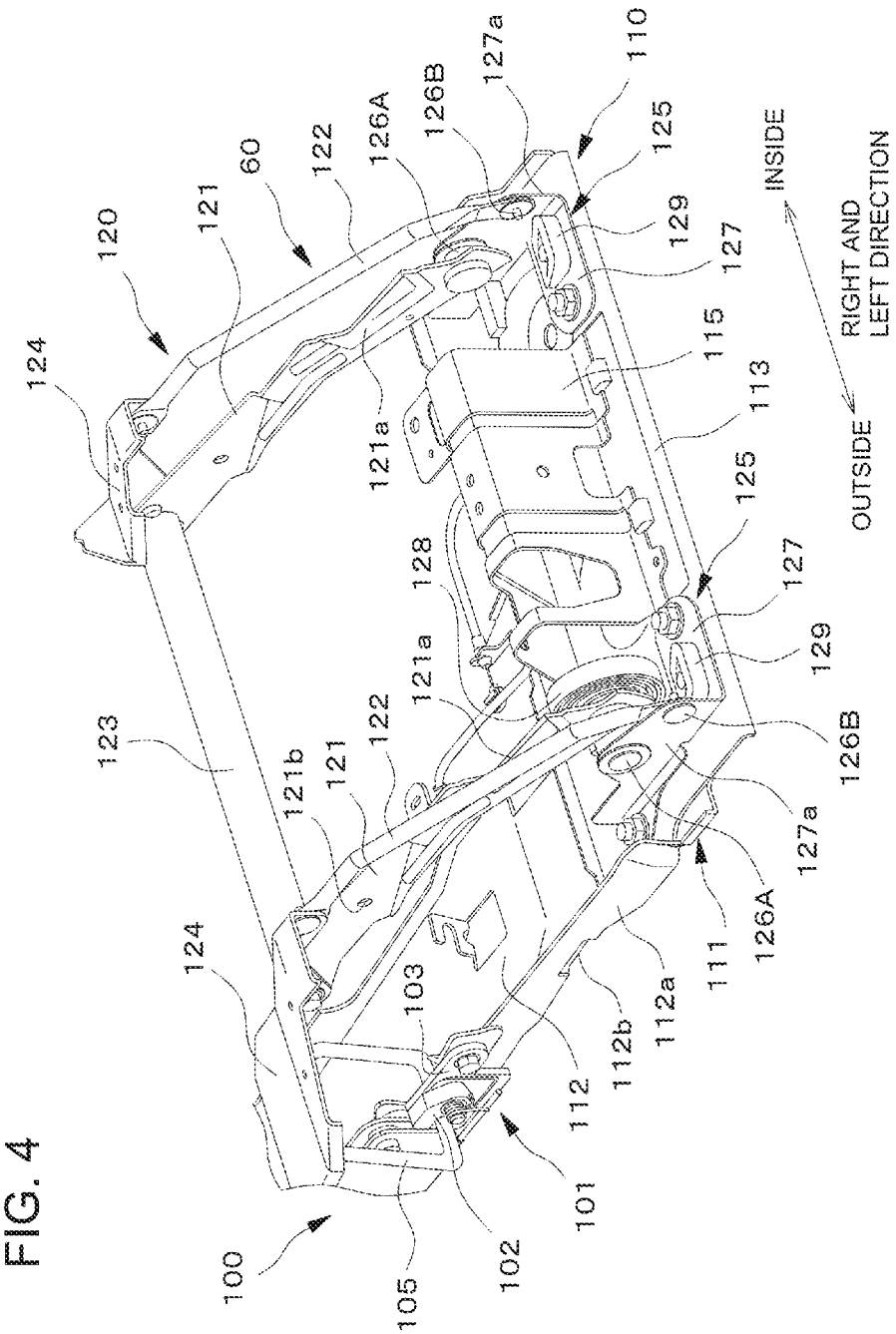
FIG. 4 is a perspective view (first diagram) of a seat cushion flip-up mechanism 60.

Further, the seat cushion flip-up mechanism 60 illustrated in FIG. 4 is disposed at the lower portion of the seat cushion 10. The seat cushion flip-up mechanism 60 is fixed onto the vehicle body floor 2. Then, the seat cushion flip-up mechanism supports the seat cushion 10, and flips up the seat cushion 10 from the sitting position toward the flip-up position when storing the vehicle seat S1.

That is, the seat cushion 10 is fixed to the sitting position on the vehicle body floor 2 through the seat cushion flip-up mechanism 60, and flips up from the sitting position toward the flip-up position when the seat cushion flip-up mechanism 60 is operated. In other words, the seat cushion 10 may move in a reciprocating manner between the sitting position and the flip-up position.

Furthermore, the seat cushion flip-up mechanism 60 includes a striker locking mechanism 100. The striker locking mechanism 100 fixes the seat cushion 10 to the sitting position when the posture of the vehicle seat S1 is maintained in the sitting posture. The seat cushion flip-up mechanism 60 and the striker locking mechanism 100 will be described in detail later.

Figure 5:
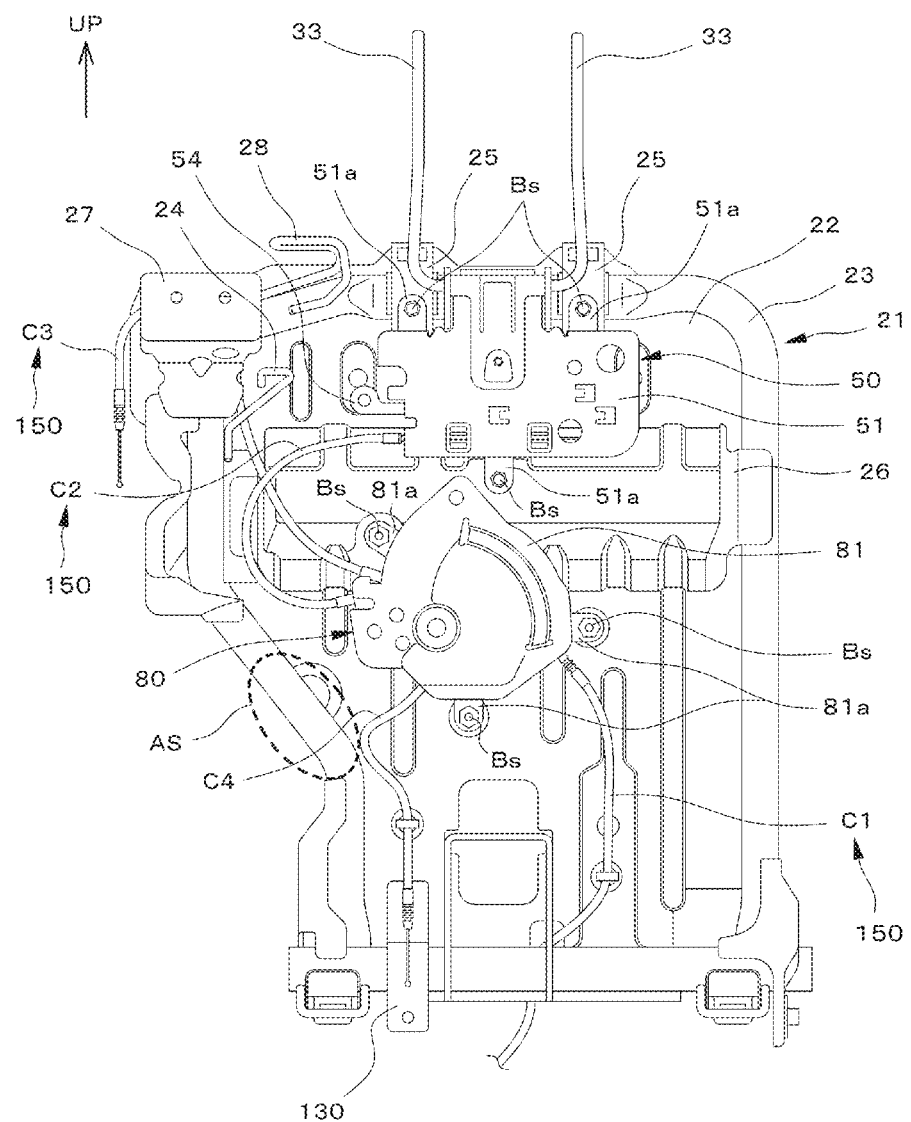
FIG. 5 is a front view diagram illustrating a seatback frame 21 when viewed from the front side thereof.

The seatback 20 is formed by providing the seatback frame 21 illustrated in FIG. 5 therein, piling urethane as a cushion material in the seatback frame 21, and covering the seatback frame by a surface material. The seatback frame 21 of the seatback 20 includes a plate shaped pan frame 22 which forms the base portion of the seatback frame 21 and a pipe frame 23 which forms the outer frame of the seatback frame 21. The pan frame 22 is molded by performing a process such as beading for ensuring rigidity on a substantially rectangular metal sheet. Then, the headrest rotating mechanism 50 or the arranging unit 80 to be described later is attached to the front surface of the pan frame 22.

The pipe frame 23 is located at the front side of the pan frame 22, is disposed along the outer edge of the pan frame 22 to surround the pan frame 22, and is bonded to the pan frame 22 by welding. Furthermore, in the pipe frame 23, a position located at the lower portion of the seatback 20 in the up and down direction and a position facing the outside of the vehicle 1 in the right and left direction are disposed to form a gap with respect to the pan frame 22 in the thickness direction of the seatback 20. The reason why such a gap is formed is because, for example, the end of the urethane as the cushion material piled on the seatback frame 21 is sandwiched between the pan frame 22 and the pipe frame 23.

Further, in the upper end of the seatback frame 21, a portion located at the rear side of a pillar 33 to be described later is provided with a pillar folding regulating portion 25 which is formed by a downward U-shaped bracket. The pillar folding regulating portion 25 corresponds to a regulating portion which regulates the rearward rotating (folding) movement of the pillar 33 when the headrest 30 is located at the sitting position. Furthermore, the pillar folding regulating portion 25 is provided for each pillar 33 (that is, two pillars), and is welded to the upper end portion of the pipe frame 23.

The seatback 20 with the above-described configuration fits a rotation shaft 20b into a hole portion of a seatback supporting unit 90 (for example, see FIG. 12) fixed to the vehicle body floor 2, and is rotatably supported by the seatback supporting unit 90. Accordingly, the seatback 20 is rotatable in the front to back direction with respect to the vehicle body floor 2, and is movable between the sitting position and the folding position. Furthermore, in this embodiment, the seatback 20 is folded forward along with the flip-up operation of the seat cushion 10. Further, only the seatback 20 may be independently folded forward.

Figure 6:
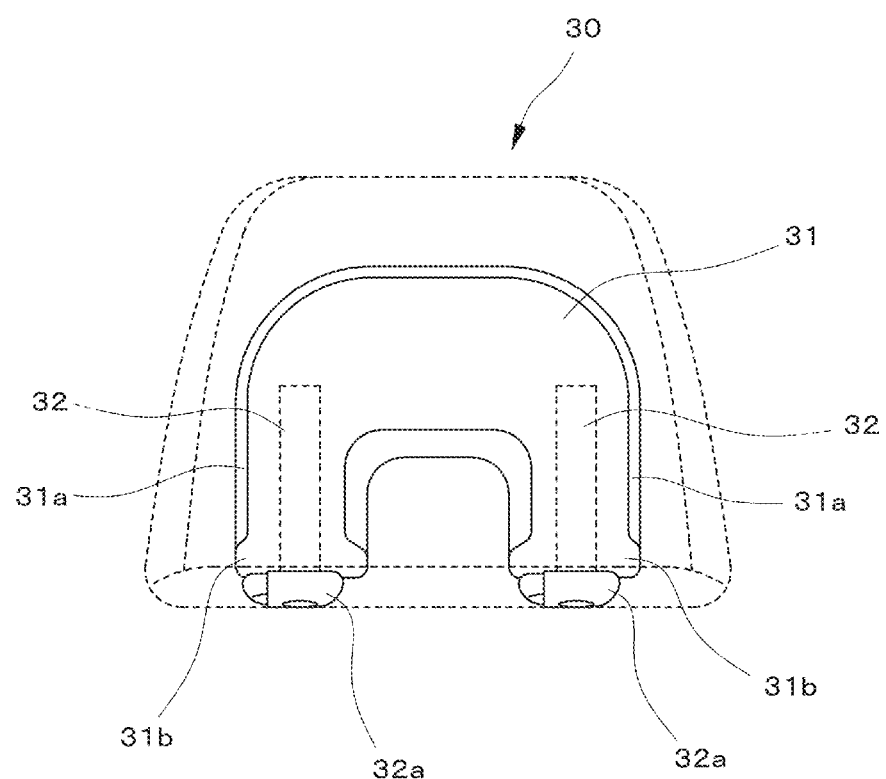
FIG. 6 is a front view diagram illustrating an inner frame 31 of a headrest 30.

The headrest 30 is provided above the seatback 20 (in other words, the seatback frame 21), and is formed by charging a foaming material between the surface material and the inverse U-shaped inner frame 31 illustrated in FIG. 6. Leg portions 31a which are located at both sides of the inverse U-shaped inner frame 31 are hollow, and each leg portion 31a is provided with a space for accommodating the hollow guide 32. The guide 32 is accommodated inside the leg portion 31a, and is movable forward and backward through an insertion hole (not illustrated) formed in a lower end flange portion 31b of the leg portion 31a of the inner frame 31. Furthermore, the surface material of the headrest 30 is provided with a guide hole (not illustrated) which is formed so that the end of the guide 32 is located at the outside of the surface material.

In the headrest 30 with the above-described configuration, a portion in the periphery of the guide hole in the surface material of the headrest 30 is sandwiched between the lower end flange portion 31b of the leg portion 31a of the inner frame 31 and a lower end flange 32a of the guide 32 in a state where the guide 32 is located at the farthest refracted position inside the leg portion 31a of the inner frame 31 (a state where the guide is accommodated inside the leg portion 31a except for the lower end flange 32a).

Further, in this embodiment, the headrest 30 is supported by the pillars 33 while the pair of pillars 33 (see FIG. 5) formed by metal bars is inserted into the guides 32, and the respective pillars 33 are rotatably supported by a casing 51 of the headrest rotating mechanism 50 to be described later.

Then, the headrest 30 may be rotated by the headrest rotating mechanism 50 until the headrest is folded forward by about 90° from the state where the headrest stands above the seatback 20. Furthermore, in this embodiment, the headrest 30 is rotated to be folded forward along with the flip-up operation of the seat cushion 10. Further, only the headrest 30 may be folded forward.

Headrest Rotating Mechanism

Next, the headrest rotating mechanism 50 will be described.

The headrest rotating mechanism 50 is a folding mechanism which folds the headrest 30 forward by rotating the pillars 33 forward. The headrest rotating mechanism 50 is attached to the front upper portion of the seatback frame 21 while being covered by a resinous cover (not illustrated).

Figure 7:
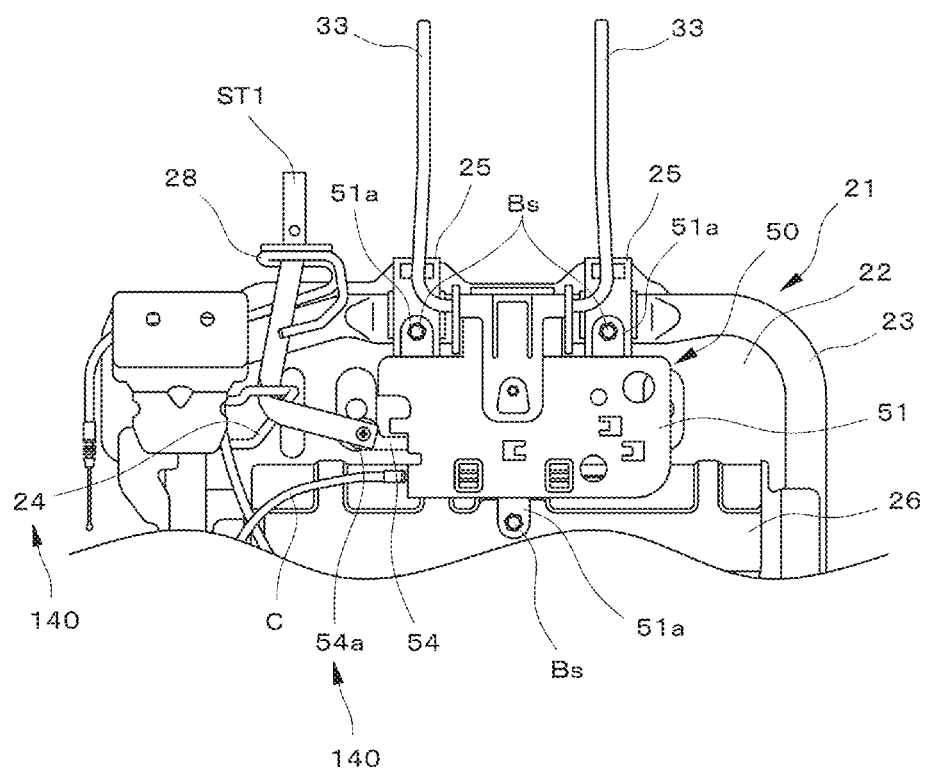
FIG. 7 is front view diagram illustrating a headrest rotating mechanism 50 when viewed from the front side thereof.
Figure 8:
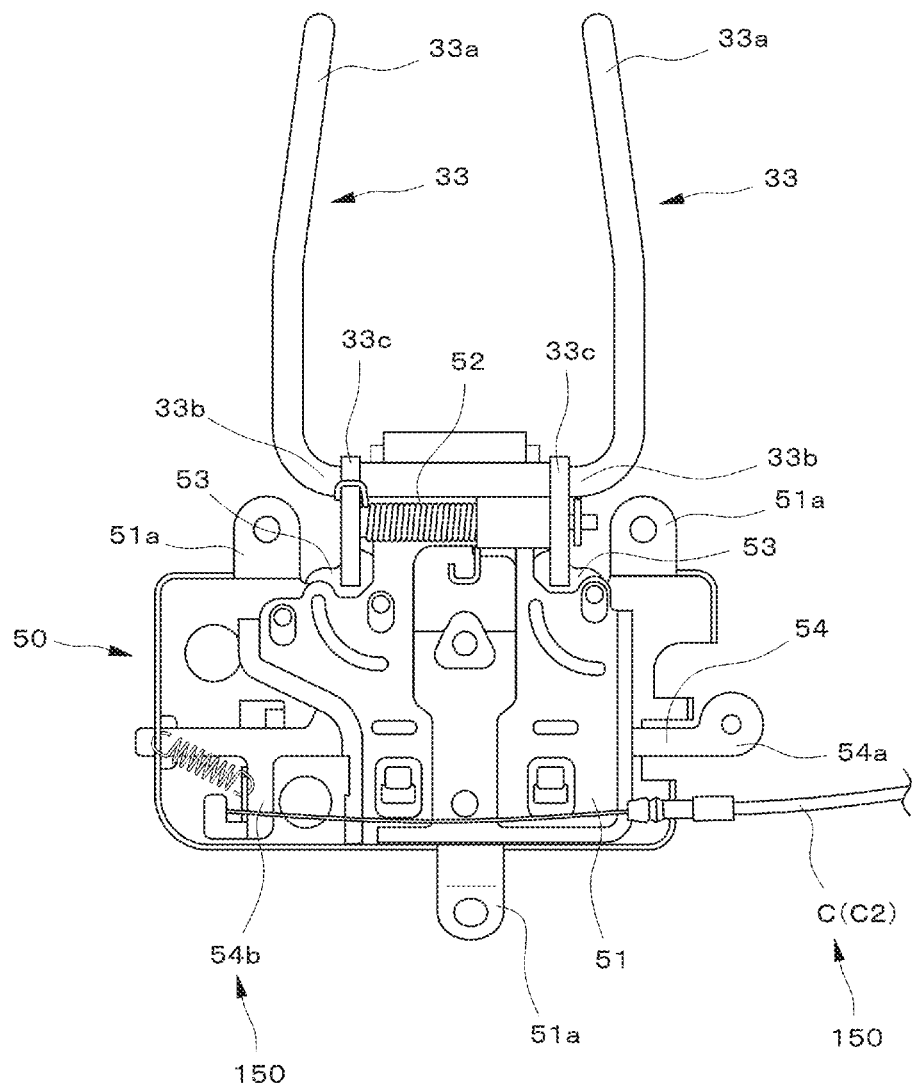
FIG. 8 is a rear view diagram illustrating the headrest rotating mechanism 50 when viewed from the rear side thereof.
Figure 9:
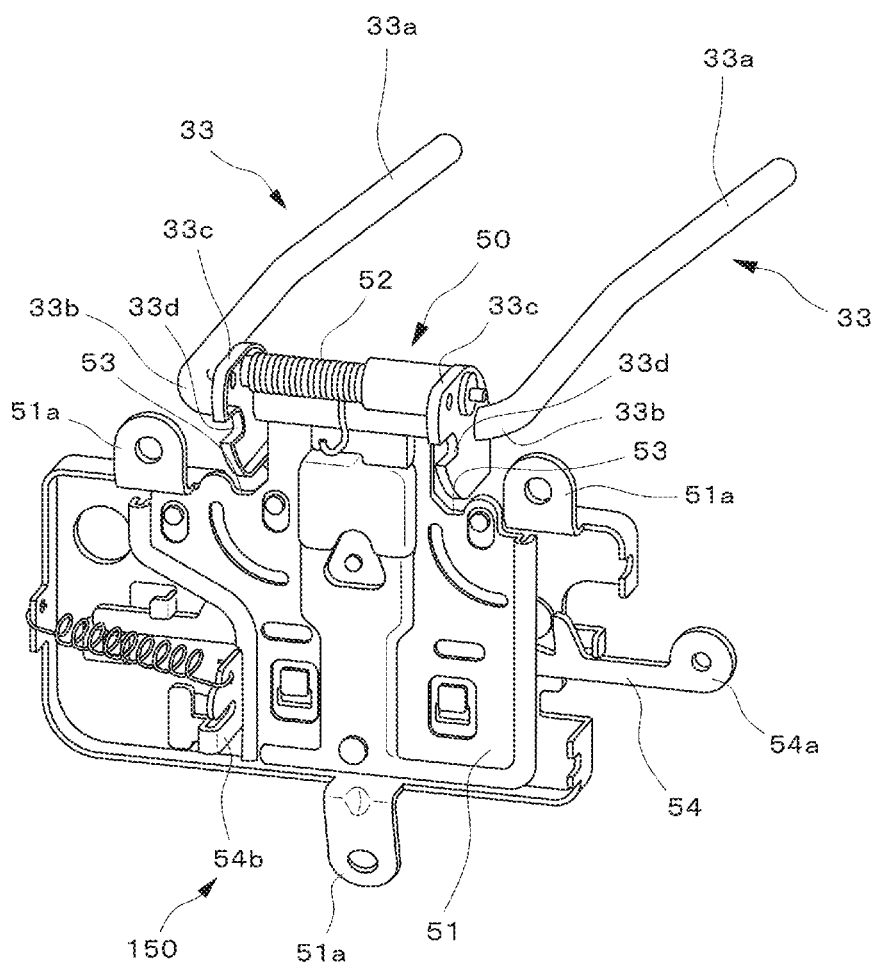
FIG. 9 is a perspective view of the headrest rotating mechanism 50.

As illustrated in FIGS. 7 to 9, the headrest rotating mechanism 50 includes the casing 51, a biasing spring 52, a locking member 53, and a slide member 54.

The casing 51 is an example of a support portion that forms the casing of the headrest rotating mechanism 50, and is obtained by multi-plying substantially rectangular metal plates in this embodiment. The casing 51 accommodates the locking member 53 or the slide member 54 therein, and its upper portion rotatably supports the pillar 33.

Then, in this embodiment, the casing 51 is attached to the front surface of the pan frame 22, and more specifically, is located between the rear end of the pan frame 22 and the front end of the pipe frame 23 in the front to back direction of the seatback frame 21 (a direction corresponding to the thickness direction of the seatback 20). In this way, since the casing 51 is fitted between the rear end of the pan frame 22 and the front end of the pipe frame 23, the vehicle seat S1 (particularly, the seatback 20) may be decreased in size. Here, the rear end of the pan frame 22 indicates the rearmost portion in the rear surface (the back surface) of the pan frame 22 in the front to back direction of the seatback frame 21. Further, the front end of the pipe frame 23 indicates the frontmost portion in the outer surface of the pipe frame 23 in the front to back direction.

The biasing spring 52 is an example of a biasing member that biases each pillar 33 forward, and is provided at the rear surface (the back surface) of the casing 51. The locking member 53 is a metallic piece member that engages with each pillar 33 to hold the pillar 33 in a standing state against the biasing force of the biasing spring 52. Here, the standing state indicates the arrangement state of the pillars 33 when the headrest 30 stands up to be located above the seatback 20 (in other words, a state where the headrest 30 is located at the sitting position).

The configuration of the locking member 53 will be described in more detail. As illustrated in FIGS. 8 and 9, each pillar 33 includes a vertical portion 33a which extends along the height direction of the vehicle seat S1 (in other words, the height direction of the seatback 20), a horizontal portion 33b which is adjacent to the lower portion of the vertical portion 33a and extends in the right and left direction (in other words, the width direction of the seatback 20), and a substantially fan shaped pillar side engagement portion 33c which is provided in the end of the horizontal portion 33b. Then, since the locking member 53 is fitted to a notch 33d formed in the pillar side engagement portion 33c, the locking member engages with the pillar 33 to hold the pillar 33 in the standing state.

Further, the locking member 53 is supported inside the casing 51 in a swingable manner, and moves between a position (engagement position) in which a part of the locking member is exposed to the outside of the casing 51 to be fittable to the notch 33d of the pillar side engagement portion 33c and a position (release position) in which the exposed portion of the locking member is received in the casing 51 to be separated from the notch 33d.

The slide member 54 is an elongated member (specifically, a ratchet lever) that is accommodated inside the casing 51, and slides along the width direction of the seatback 20 to swing the locking member 53. In a normal state, the slide member 54 is located at a position which causes the locking member 53 to reach the engagement position. Then, when the slide member 54 slides toward one end in the front to back direction, the locking member 53 reaches the release position.

In the headrest rotating mechanism 50 with the above-described configuration, the pillar 33 is held in the standing state against the biasing force of the biasing spring 52 while the locking member 53 engages with the pillar side engagement portion 33c of the pillar 33 at the engagement position so that the headrest 30 is held at the sitting position.

When the locking member 53 swings from the engagement position to the release position by the sliding movement of the slide member 54, the engagement between the locking member 53 and the pillar side engagement portion 33c is released, the pillar 33 rotates forward by the biasing force of the biasing spring 52 so that the headrest 30 is folded forward. The series of operations are operations for folding the headrest 30 forward, and correspond to the folding operations.

In this embodiment, two paths for applying a driving force to the slide member 54 to slide the slide member are prepared. One path is a path which receives an operation performed by a passenger to independently fold only the headrest 30 forward and directly transmits the operation to the slide member 54 to slide the slide member.

Specifically, the vehicle seat S1 according to this embodiment is provided with a belt shaped member ST1 that receives the operation performed by the passenger to independently fold only the headrest 30 forward. The belt shaped member ST1 corresponds to a first receiving portion, and extends from the upper end surface of the seatback 20 along the guide hole provided in the upper end surface of the seatback 20 (see FIG. 2). Then, the passenger pulls the belt shaped member ST1 along the height direction of the seatback 20 when independently folding only the headrest 30 forward. That is, in this embodiment, the pulling operation for pulling the belt shaped member ST1 along the height direction of the seatback 20 corresponds to the first operation which is performed by the passenger when independently folding only the headrest 30 forward.

Figure 2:
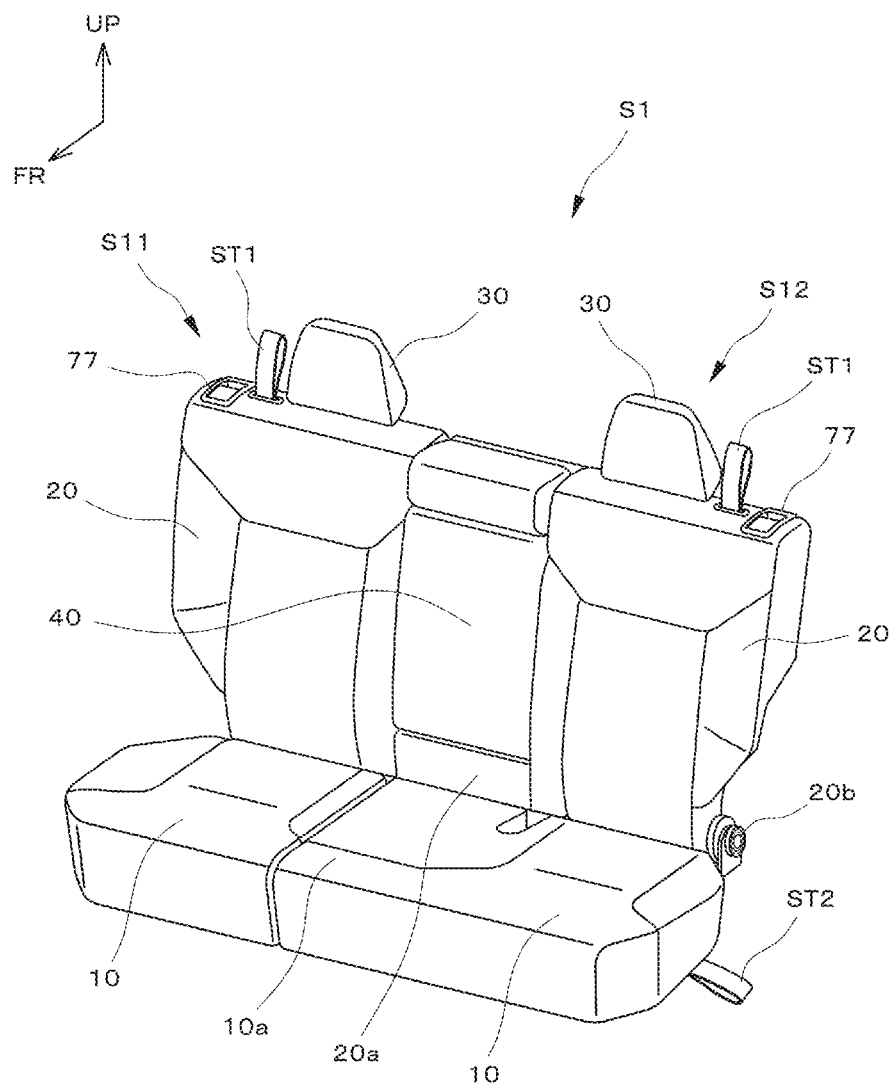
FIG. 2 is a perspective view of the vehicle seat S1.

Furthermore, in this embodiment, the belt shaped member ST1 extends from the portion located at the outside of the vehicle 1 in relation to the headrest 30 in the width direction of the seatback 20 in the upper end surface of the seatback 20 (see FIG. 2). In this way, since the belt shaped member ST1 extends from a position which may be easily seen by the passenger, the passenger may easily reach the belt shaped member ST1 and easily perform the operation of pulling the belt shaped member ST1. Further, in this embodiment, since the belt shaped member ST1 extends from the side position of the headrest 30, the passenger may easily recognize the belt shaped member ST1 as a member that is operated to fold the headrest 30 forward. By the above-described result, the vehicle seat S1 with excellent operability may be realized.

The extension position of the belt shaped member ST1 will be further described. In this embodiment, the belt shaped member ST1 extends from a position between the headrest 30 and the operation unit 77 (specifically, an operation cover 77a and an operation lever 77b) in the width direction of the seatback 20 on the upper end surface of the seatback 20. Here, the periphery of the operation unit 77 in the seatback 20 has high rigidity. For this reason, when the belt shaped member ST1 extends from the periphery, the operation of pulling the belt shaped member ST1 is stably performed.

The belt shaped member ST1 is fastened to one longitudinal end 54a of the slide member 54. Here, one longitudinal end 54a of the slide member 54 corresponds to a fastening portion which is formed in the slide member 54 to fasten the belt shaped member ST1 and the slide member 54 to each other.

Further, the belt shaped member ST1 may be bent at a substantially right angle by abutting against a hooking rod 24 attached to the seatback frame 21 at the halfway position of the extension range. Here, the hooking rod 24 is formed by a linear member, such as a wire, and corresponds to a bending member which abuts against the belt shaped member ST1 to bend the belt shaped member ST1. Then, when the hooking rod 24 bends the belt shaped member ST1 at a substantially right angle at the halfway position thereof, the movement direction of the belt shaped member ST1 is switched from the height direction of the seatback 20 to the width direction of the seatback 20.

That is, the hooking rod 24 corresponds to a converting portion which converts the pulling operation of pulling the belt shaped member ST1 along the height direction of the seatback 20 into the sliding movement of the slide member 54 along the width direction of the seatback 20.

Further, the hooking rod 24 according to this embodiment abuts against the belt shaped member ST1 so that the belt shaped member ST1 is bent at the front side in relation to the front end of the pipe frame 23 in the front to back direction of the seatback frame 21. Accordingly, the operability of the belt shaped member ST1 is improved by suppressing the contact of the belt shaped member ST1 with respect to the pipe frame 23. That is, when the belt shaped member ST1 contacts the pipe frame 23, the belt shaped member ST1 rubs the surface of the pipe frame 23. For this reason, abnormal noise is generated or the belt shaped member ST1 is not easily pulled due to the friction. However, since the contact between the belt shaped member ST1 and the pipe frame 23 is suppressed, these problems may be prevented.

Furthermore, in order to prevent the contact between the belt shaped member ST1 and the pipe frame 23, an abutting member 28 that abuts against the belt shaped member ST1 at the front side of the pipe frame 23 as in the hooking rod 24 is disposed in the periphery of the portion where the belt shaped member ST1 protrudes from the upper end surface of the seatback 20 in the seatback 20. Then, the belt shaped member ST1 abuts against the abutting member 28 at the front side of the pipe frame 23, and extends from the upper end surface of the seatback 20.

In the above-described configuration, when the passenger pulls the belt shaped member ST1 along the height direction of the seatback 20, the movement direction of the belt shaped member ST1 is switched to the width direction of the seatback 20 by the operation of the hooking rod 24. Then, when the belt shaped member ST1 moves along the width direction, the slide member 54 of which one longitudinal end 54a is fastened to the belt shaped member ST1 slides in the same direction so that the locking member 53 swings to the release position. As a result, only the headrest 30 is independently folded forward while the seat cushion 10 and the seatback 20 are held at the sitting position.

As described above, the vehicle seat S1 according to this embodiment is provided with a first driving portion 140 which drives only the headrest rotating mechanism 50 by the pulling operation received by the belt shaped member ST1 and permits the headrest rotating mechanism 50 to perform a folding operation.

Specifically, the first driving portion 140 mainly includes one longitudinal end 54a of the slide member 54 as the fastening portion and the hooking rod 24 as the bending member. Then, the first driving portion 140 transmits the operation of pulling the belt shaped member ST1 only to the headrest rotating mechanism 50 through the hooking rod 24 and one longitudinal end 54a of the slide member 54, and drives only the headrest rotating mechanism 50 by using the pulling operation as a driving force.

As the other path which applies a driving force to the slide member 54 to slide the slide member, the path receives an operation (hereinafter, referred to as a storing operation) performed by the passenger when storing the vehicle seat S1 and transmits the operation to the slide member 54 of the headrest rotating mechanism 50. That is, this path is devised as a part of the operation of storing the vehicle seat S1, and transmits the storing operation to the slide member 54 to slide the slide member 54 so that the headrest 30 is folded forward.

Specifically, a storing operation belt shaped member ST2 (see FIG. 11) is provided which receives the operation (storing operation) performed by the passenger to store the vehicle seat S1. The storing operation belt shaped member ST2 corresponds to a second receiving portion, and is fastened to the seat cushion flip-up mechanism 60 to be described later. Then, the passenger pulls the storing operation belt shaped member ST2 toward the outside of the vehicle 1 when storing the vehicle seat S1. That is, in this embodiment, the operation of pulling the storing operation belt shaped member ST2 toward the outside of the vehicle 1 corresponds to the storing operation, that is, a second operation which is performed by the passenger when storing the vehicle seat S1.

Furthermore, the storing operation belt shaped member ST2 extends from the lateral side toward outside of the vehicle 1 in the vehicle seat S1, and is located at the lower portion of the seat cushion 10 when the posture of the vehicle seat S1 is held in the sitting posture.

Then, when the storing operation belt shaped member ST2 receives the storing operation performed by the passenger (the passenger pulls the storing operation belt shaped member ST2 toward the outside of the vehicle 1), the seat cushion flip-up mechanism 60 first performs an operation (hereinafter, a flip-up operation) in which the seat cushion 10 flips up by the storing operation to move to the flip-up position.

One end of a cable C is attached to the seat cushion flip-up mechanism 60 (more specifically, a link 121 of a movable unit 120 to be described later), and the other end of the cable C is attached to the arranging unit 80 to be described later. Further, the other cable C extends from the arranging unit 80, and its front end is locked to a side wall of an extension portion 54*b* extending in a direction intersecting the front to back direction at the other end side of the slide member 54 in the front to back direction (the side opposite to the fastening side of the belt shaped member ST1). Here, the extension portion 54*b* corresponds to a connection portion which is formed in the slide member 54 to connect the seat cushion flip-up mechanism 60 and the slide member 54 to each other.

More specifically, in this embodiment, the seat cushion flip-up mechanism 60 and the arranging unit 80 are connected to each other by the cable C, and the arranging unit 80 and the extension portion 54*b* are connected to each other by the other cable C. Thus, the seat cushion flip-up mechanism 60 and the slide member 54 are connected to each other by the extension portion 54*b* through the arranging unit 80 and the cable C.

Furthermore, in this embodiment, one longitudinal end 54*a* of the slide member 54 is nearer than the extension portion 54*b* formed at the other end in the front to back direction when viewed from the belt shaped member ST1, (for example, see FIGS. 7 and 8). In other words, in this embodiment, one longitudinal end 54*a* of the slide member 54 is located near the belt shaped member ST1 in relation to the extension portion 54*b*. Accordingly, the positional relation between the belt shaped member ST1 and the slide member 54 becomes appropriate, and hence the assembling workability of the vehicle seat S1 is further improved.

Specifically, when the operation (operability) of the belt shaped member ST1 with respect to the slide member 54 is considered, it is preferable that the fastening position between the belt shaped member ST1 and the slide member 54 is extremely near the belt shaped member ST1. For this reason, when the belt shaped member ST1 is fastened to one longitudinal end 54*a* of the slide member 54 which is very near the belt shaped member ST1, the length of the belt shaped member ST1 may be shortened, and hence the assembling workability of the vehicle seat S1 is further improved.

In the above-described configuration, when the flip-up operation is performed by the seat cushion flip-up mechanism 60, the operation is transmitted to the arranging unit 80 through the cable C. In the arranging unit 80 to which the flip-up operation is transmitted, the respective operation portions (specifically, a first rotating member 83 and a second rotating member 84 to be described later) are operated. Accordingly, the cable C, which is locked to the extension portion 54*b* formed in the slide member 54 of the headrest rotating mechanism 50, is pulled, and the slide member 54 slides by the operation of pulling the cable C so that the locking member 53 swings to the release position.

As will be described later, the seatback folding mechanism 70 is also operated in addition to the headrest rotating mechanism 50 by the operation of respective operation portions of the arranging unit 80. As a result, the seat cushion 10 and the seatback 20 respectively move toward the folding position so that the posture of the vehicle seat S1 is switched from the sitting posture to the storing posture.

As described above, the vehicle seat S1 according to this embodiment is provided with the second driving portion 150. Then, when the storing operation belt shaped member ST2 receives the storing operation, the second driving portion 150 drives the headrest rotating mechanism 50 along with the flip-up operation (that is, the movement of the seat cushion 10 to the flip-up position) of the seat cushion flip-up mechanism 60 so that the folding operation of the headrest rotating mechanism 50 is performed.

Specifically, the second driving portion 150 includes the extension portion 54*b* which is formed to connect the seat cushion flip-up mechanism 60 to the slide member 54 of the headrest rotating mechanism 50, the cable C (more specifically, a first cable C1 and a second cable C2 to be described later) which is provided between the seat cushion flip-up mechanism 60 and the slide member 54, and the arranging unit 80 to be described later. Then, when the passenger pulls the storing operation belt shaped member ST2 toward the outside of the vehicle 1, the seat cushion flip-up mechanism 60 is operated, the seat cushion 10 flips up toward the flip-up position, and the flip-up operation performed by the seat cushion flip-up mechanism 60 is transmitted to the slide member 54 through the cable C and the arranging unit 80.

More specifically, the cable C attached to the seat cushion flip-up mechanism 60 is pulled with the flip-up operation, and the arranging unit 80 is operated by the operation of pulling the cable C. Accordingly, the other cable C (that is, the cable C of which one end is locked to the extension portion 54*b* of the slide member 54) which extends from the arranging unit 80 to the headrest rotating mechanism 50 is pulled. As a result, the slide member 54 slides, and finally, the locking member 53 swings toward the release position. By the above-described series of movement, the second driving portion 150 folds the headrest 30 forward as a part of the operation of storing the vehicle seat S1.

Furthermore, in this embodiment, the arranging unit 80 as the relay mechanism is provided between the seat cushion flip-up mechanism 60 and the headrest rotating mechanism 50. That is, in this embodiment, the seat cushion flip-up mechanism 60 and the headrest rotating mechanism 50 are connected to each other through the arranging unit 80 instead of connecting the seat cushion flip-up mechanism 60 and the headrest rotating mechanism 50 to each other by one cable C. In this way, since the seat cushion flip-up mechanism 60 and the headrest rotating mechanism 50 are connected to each other by a plurality of cables C, it is possible to shorten the length of each cable C and hence to easily replace the cable when the cable is cut.

Next, the attachment of the headrest rotating mechanism 50 will be described. As described above, the headrest rotating mechanism 50 is attached to the upper portion of the seatback frame 21. Particularly, in this embodiment, the headrest rotating mechanism is attached to the front side of the seatback frame 21 by a stud bolt Bs.

More specifically, in this embodiment, the respective components of the headrest rotating mechanism 50 are not individually attached, but are attached to the seatback frame 21 while being integrated as a unit. Furthermore, the headrest rotating mechanism 50 is attached to the seatback frame 21 while being assembled to the pillar 33.

Here, in this embodiment, the attachment stud bolt Bs is set to the front side of the seatback frame 21 in advance in the previous step of the attachment of the headrest rotating mechanism 50. The upper and lower portions of the casing 51 of the headrest rotating mechanism 50 are provided with bolt receiving portions 51a which protrude outward. Then, when attaching the headrest rotating mechanism 50 to the seatback frame 21, the headrest rotating mechanism 50 is attached from the front side of the seatback frame 21 through the stud bolt Bs to the bolt hole formed in the bolt receiving portion 51a. In this way, in this embodiment, the headrest rotating mechanism 50 may be attached as one unit, and may be attached from the front side of the seatback frame 21. Accordingly, the headrest rotating mechanism 50 may be easily attached, and hence the assembling workability is improved.

Furthermore, in this embodiment, the installation positions of the bolt receiving portions 51a (in other words, the positions of fixing the headrest rotating mechanism 50 to the seatback frame 21) are three positions. Specifically, the bolt receiving portions are provided at two positions on the upper side of the casing 51 of the headrest rotating mechanism 50, and are provided at one position on the lower side of the casing 51. Here, the stud bolts Bs, which are received by the bolt receiving portions 51a provided on the upper side of the casing 51 of the headrest rotating mechanism 50, are provided in the pillar folding regulating portion 25. That is, in this embodiment, the headrest rotating mechanism 50 is fixed to the pillar folding regulating portion 25.

More specifically, the upper portion of the seatback frame 21 is provided with the pillar folding regulating portion 25 for each pillar 33, and the stud bolt Bs is set to the front surface of each pillar folding regulating portion 25 to slightly protrude from the front surface. When the stud bolt Bs passes through the bolt hole of the bolt receiving portion 51a provided on the upper side of the casing 51 of the headrest rotating mechanism 50 and the casing 51 is attached to each pillar folding regulating portion 25 by the stud bolt Bs, the headrest rotating mechanism 50 is fixed to each pillar folding regulating portion 25.

In this way, in this embodiment, the headrest rotating mechanism 50 is fixed by effectively using the installation space of the pillar folding regulating portion 25. Accordingly, the vehicle seat S1 may be decreased in size. More specifically, the respective pillar folding regulating portions 25 are located at the inside in relation to both ends of the casing 51 of the headrest rotating mechanism 50 in the right and left direction (the width direction of the seatback 20). In this way, since the fixing position of the headrest rotating mechanism 50 is provided in the pillar folding regulating portions 25 located at the inside in relation to both ends of the casing 51 of the headrest rotating mechanism 50, it is possible to further decrease the size of the vehicle seat S1 compared to a case where the fixing positions are provided at the outside in relation to both ends of the casing 51 of the headrest rotating mechanism 50.

Further, the pillar 33 includes the vertical portion 33a which extends in the up and down direction of the seatback frame 21, where the center portion of the front surface of the pillar folding regulating portion 25 is located at the position of the vertical portion 33a in the width direction of the seatback 20, and the stud bolt Bs is set to such a position. That is, in this embodiment, the stud bolt Bs exists on the axis of the vertical portion 33a of the pillar 33. Accordingly, the vehicle seat S1 may be further decreased in size. Specifically, since a region allocated for the arrangement of the pillar 33 (particularly, the vertical portion 33a) in the width direction of the seatback 20 is effectively used to set the stud bolt Bs as a member other than the pillar 33, there is no need to particularly ensure a space for setting the stud bolt Bs, and hence the vehicle seat S1 may be decreased in size.

Further, in the pillar 33, the lower end of the front surface of the pillar folding regulating portion 25 is located at the lower position in the height direction of the seatback 20 in relation to the horizontal portion 33b which is adjacent to the vertical portion 33a and extends in the width direction of the seatback 20, and the stud bolt Bs is set to such a position. Accordingly, the vehicle seat S1 may be further decreased in size. Specifically, an empty space is formed below the bonding position between the vertical portion 33a and the horizontal portion 33b (in other words, the bent position of the pillar 33). When this empty space is used to install the stud bolt Bs, there is no need to separately ensure a space for setting the stud bolt Bs, and hence the vehicle seat S1 may be decreased in size.

The stud bolt Bs which is received by the bolt receiving portion 51a provided at the lower side of the casing 51 of the headrest rotating mechanism 50 is set to the pan frame 22 of the seatback frame 21. Particularly, in this embodiment, the stud bolt Bs is set to a portion overlapping a reinforcing plate 26 in the pan frame 22. In this way, in this embodiment, since the stud bolt Bs is set to the highly rigid portion in the pan frame 22 and the headrest rotating mechanism 50 is fixed by such a stud bolt Bs, the headrest rotating mechanism 50 is appropriately provided, and hence the respective components of the headrest rotating mechanism 50 are stably operated.

Seat Cushion Flip-Up Mechanism

The seat cushion flip-up mechanism 60 is an example of the movement mechanism, and performs the flip-up operation as a start operation for storing the vehicle seat S1 when the storing operation performed by the passenger is received by the storing operation belt shaped member ST2. Here, the flip-up operation indicates the movement operation that flips up the seat cushion 10 to the flip-up position.

Furthermore, in this embodiment, the seat cushion flip-up mechanism 60 is covered by a resin cover (not illustrated), and is provided on the vehicle body floor 2 to be located at the lower position of the seat cushion 10 when the seat cushion 10 is located at the sitting position.

Figure 10:
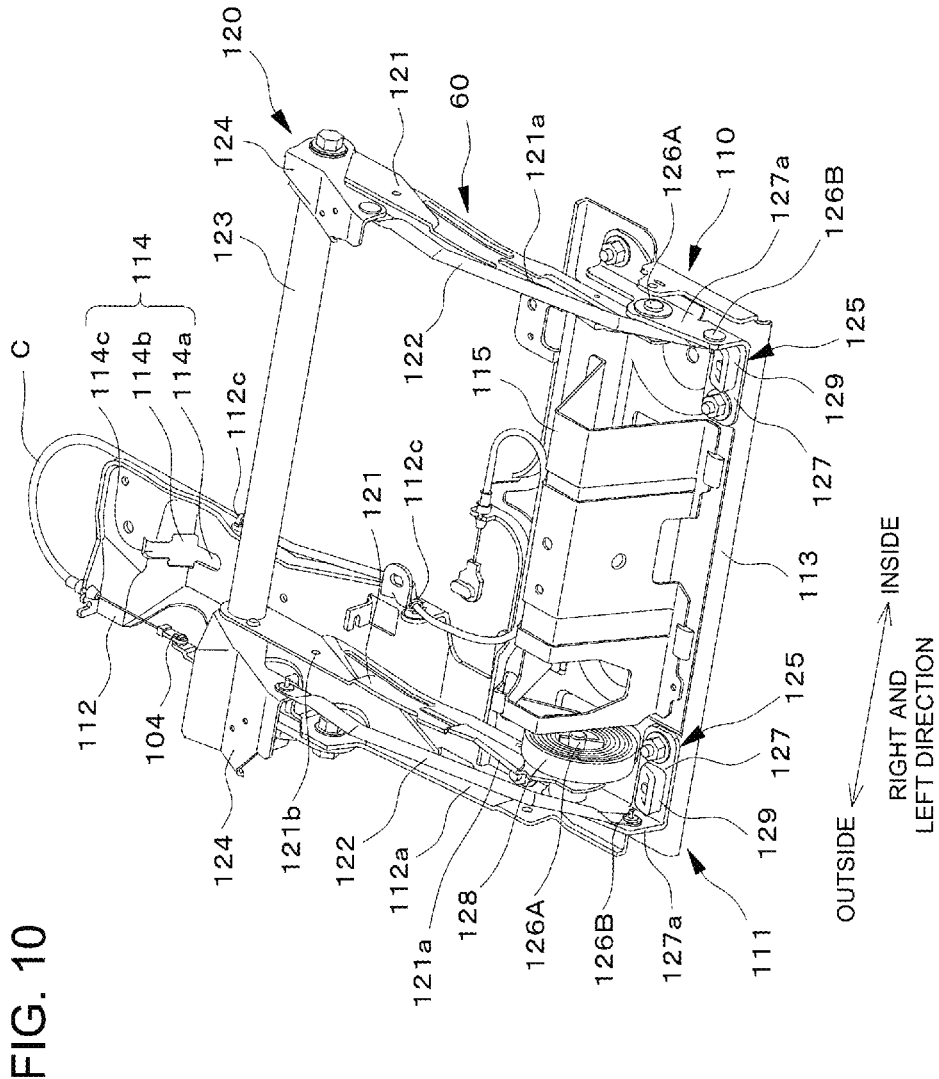
FIG. 10 is a perspective view (second diagram) of a seat cushion flip-up mechanism 60.
Figure 11:
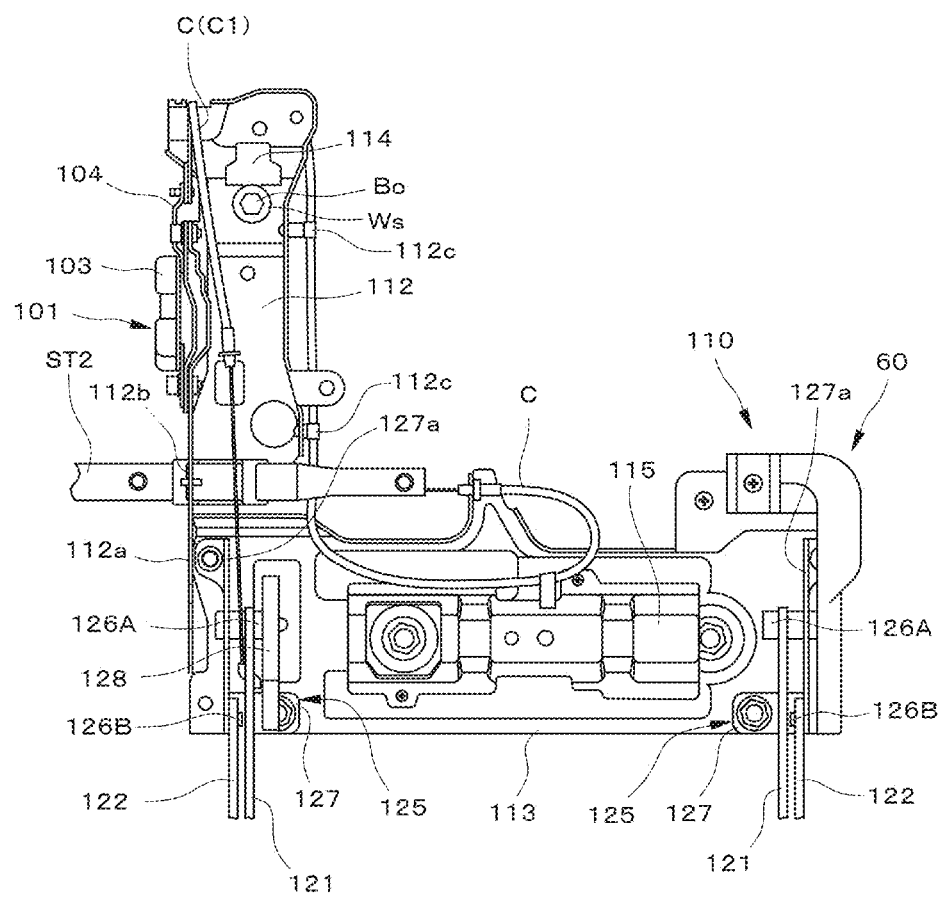
FIG. 11 is a plan view diagram illustrating the seat cushion flip-up mechanism 60 when viewed from the top side thereof.

As illustrated in FIGS. 4, 10, and 11, the seat cushion flip-up mechanism 60 includes two components, where one component is an attachment unit 110 which is attached to the vehicle body floor 2, and the other component is a movable unit 120 which is disposed on the attachment unit 110 and swings (rotates) with respect to the attachment unit 110 (in other words, the vehicle body floor 2).

The attachment unit 110 mainly includes an attachment plate 111 which is formed in an L-shape in a top view. In the attachment plate 111, the first plate portion 112 which extends in the front to back direction of the vehicle 1 is fixed to the vehicle body floor 2 by the bolt Bo and the washer Ws fastened in the vehicle body floor 2 (see FIG. 11). Here, the rear end of the first plate portion 112 is provided with an attachment hole 114 formed in an elongated hole shape, and when the bolt Bo and the washer Ws set to the vehicle body floor 2 are fitted to the attachment hole 114, the attachment unit 110 is disposed on the vehicle body floor 2.

Furthermore, the center portion 114b of the attachment hole 114 in the front to back direction has a width that is slightly larger than that of the front end 114a or the rear end 114c. When fitting the bolt Bo and the washer Ws to the attachment hole 114 by using such a configuration, the bolt Bo and the washer Ws first pass through the center portion 114b of the attachment hole 114 in the longitudinal direction, and the attachment unit 110 is positioned by displacing the position of the attachment unit 110 so that the bolt Bo is fitted to the front end 114a of the attachment hole 114 in the longitudinal direction.

Further, a locking portion 101 of the striker locking mechanism 100 is attached to the substantial center portion of the first plate portion 112 in the longitudinal direction. The locking portion 101 includes a hook shaped locking piece 102 and a housing 103 which accommodates the locking piece 102 in a swingable state. In a state where the locking piece 102 engages with a striker 105 to be described later, the seat cushion 10 is fixed onto the vehicle body floor 2 at the sitting position. When the locking piece 102 swings, the striker 105 is released from the engagement state with the locking piece 102, and hence the seat cushion 10 is released from the state where the seat cushion is fixed onto the vehicle body floor 2 to be movable.

Further, one side portion of the first plate portion 112 is provided with an upright wall portion 112a, and in the upright wall portion 112a, a slit 112b through which the storing operation belt shaped member ST2 passes through is formed at a slightly front position in relation to the attachment position of the locking portion 101. The storing operation belt shaped member ST2 which passes through the slit 112b is disposed on the first plate portion 112 to intersect the first plate portion 112. Further, one end of the cable C is connected to the end of the storing operation belt shaped member ST2 (the end at the inside of the vehicle 1 when viewed from the first plate portion 112), and path defining portions 112c for defining the wiring path when wiring the cable C are provided at an appropriate interval in the side portion of the first plate portion 112 (the side portion opposite to the position of the upright wall portion 112a).

Then, the other end of the cable C is connected to a connection piece 104 connected to the locking piece 102. Accordingly, when the storing operation belt shaped member ST2 is pulled, the cable C pulls the locking piece 102 through the connection piece 104. As a result, the locking piece 102 swings so that the engagement between the locking piece 102 and the striker 105 is released.

In the attachment plate 111, a second plate portion 113 which extends along the right and left direction of the vehicle 1 (the width direction of the seatback 20) is a base portion of the movable unit 120, and its center portion in the front to back direction is provided with a submarine bracket 115 which prevents a submarine phenomenon in which the passenger sitting on the seat cushion 10 sinks and slides under the waist belt in the event of the collision of the vehicle 1.

The movable unit 120 has a substantially door structure, and is fixed to the second plate portion 113 of the attachment plate 111 by a bolt. The movable unit 120 includes a pair of links 121, a pair of pipe rods 122, a connection bar 123 which connects the links 121 to each other, an attachment bracket 124 for attaching the seat cushion 10, and a pair of support mechanisms 125 which rotatably support the links 121 and the pipe rods 122. These components are combined to be integrated as a unit, and are integrally attached as a unit when being attached to the second plate portion 113 of the attachment plate 111.

The pair of links 121 is an elongated body which is formed by performing a process such as beading on a metal sheet, and is located at both side portions of the movable unit 120. Each link 121 is rotatably supported in a manner such that a rotation shaft 126A is fitted to a guide hole (not illustrated) formed in its lower end. Further, the connection bar 123 which connects the links 121 to each other is attached to the upper ends of the respective links 121. Further, the attachment bracket 124 is attached to the outer surfaces of the upper ends of the respective links 121. Furthermore, the connection bar 123 and the attachment bracket 124 are attached to the upper ends of the links 121 by a bolt according to a common fastening type.

The pair of pipe rods 122 is disposed in parallel to the links 121, and is supported to be rotatable in the same direction as the rotation direction of the link 121 in a manner such that a rotation shaft 126B is fitted to a guide hole (not illustrated) formed in the lower end. Further, the attachment bracket 124 is pinned to the upper end of each pipe rod 122. Then, in this embodiment, the seat cushion 10 is supported by the pair of links 121 and the pair of pipe rods 122 through the attachment bracket 124. Further, each pipe rod 122 follows the rotation of the link 121 to rotate in the same direction as the rotation direction of the link 121.

Further, among the pair of links 121 and the pipe rods 122, the striker 105 of the striker locking mechanism 100 is attached to the lower surface of the attachment bracket 124 attached to the link 121 and the pipe rod 122 facing the outside of the vehicle 1. Then, when the link 121 and the pipe rod 122 rotate to fall rearward when viewed from the rotation shafts 126A and 126B, the striker 105 reaches a position where the striker may engage with the locking piece 102 of the locking portion 101 provided in the attachment plate 111 (more specifically the first plate portion 112).

The pair of support mechanisms 125 is used to rotatably support the link 121 and the pipe rod 122, and includes a base bracket 127 and a damper rubber 129 other than the rotation shafts 126A and 126B as illustrated in FIGS. 4, 10, and 11.

The base bracket 127, which is a metal sheet member that is substantially formed in a Z-shape in a top view, forms the base of the movable unit 120, and is fixed to the second plate portion 113 of the attachment plate 111 by a bolt. Further, in the base bracket 127, a portion which extends along the front to back direction of the vehicle 1 becomes an upright wall portion 127a, and the rotation shafts 126A and 126B are attached to the upright wall portion 127a.

The damper rubber 129 abuts against the front end of the link 121 to absorb an impact generated in the link 121 when the link 121 rotates and reach the forward limit position by the biasing force of the spiral spring 128. The damper rubber 129 is fixed to the base bracket 127 to be slightly located at the front side of the portion as the rotation support point of the link 121.

Furthermore, in this embodiment, in order to prevent the cutting of the damper rubber 129 due to the abutting (collision) of the link 121 against the damper rubber 129, an abutting portion 121a that is located at a position abutting against the damper rubber 129 in the longitudinal direction of the link 121 is bent, and the front end of the abutting portion 121a is rounded.

A spiral spring 128 is provided in the support mechanism 125 which is located at the outside of the vehicle 1 in the pair of support mechanisms 125. The spiral spring 128 is a biasing member that biases the link 121 so that the link falls forward. One end of the spiral spring 128 is locked to the rotation shaft 126A and the other end thereof is locked to a protrusion portion (not illustrated) protruding from the side surface of the link 121 while the link 121 falls rearward (in other words, before the seat cushion 10 flips up).

With the above-described configuration, the seat cushion 10 is held at the sitting position while receiving the biasing force of the spiral spring 128 through the link 121 (in other words, against the biasing force of the spiral spring 128) when the striker 105 engages with the locking piece 102. When the engagement between the striker 105 and the locking piece 102 is released, the link 121 rotates forward by the biasing force of the spiral spring 128 so that the seat cushion 10 flips up toward the flip-up position.

Furthermore, in the case illustrated in FIGS. 4, 10, and 11, the spiral spring 128 is provided only on one of the pair of links 121, but the present invention is not limited thereto. For example, the spiral spring 128 may be provided for each of both links 121.

Further, in this embodiment, an insertion hole 121b is provided in the course of one link 121 (the link 121 located at the outside of the vehicle 1) in the longitudinal direction, and one end of the cable C is inserted into the insertion hole 121b. The other end of the cable C is connected to the arranging unit 80 (more specifically, the first rotating member 83). Thus, since the link 121 rotates when the seat cushion 10 flips up, the cable C connected to the link 121 is pulled. Finally, the respective components of the arranging unit 80 connected with the cable C are operated by using the pulling force of the cable C. Furthermore, the configuration and the operation of the arranging unit 80 will be described in detail later.

Seatback Folding Mechanism

Next, the seatback folding mechanism 70 will be described.

Figure 12:
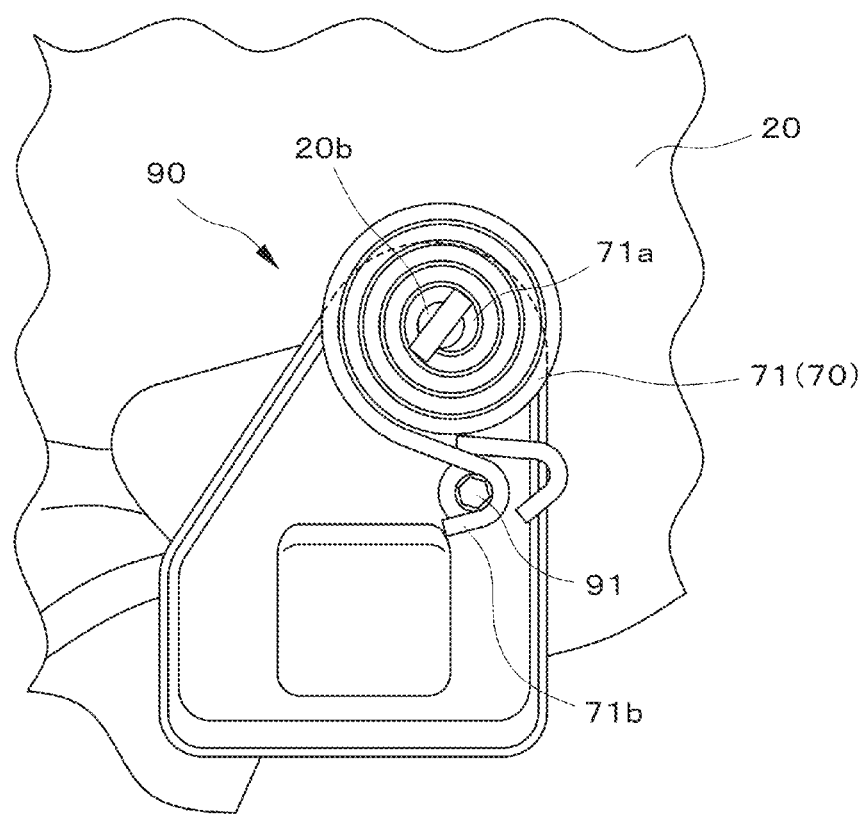
FIG. 12 is a side view diagram illustrating a seatback supporting unit 90 when viewed from the side thereof.

The seatback folding mechanism 70 is a mechanism that rotates the seatback 20, rotatably supported by the seatback supporting unit 90 illustrated in FIG. 12, so that the seatback is folded forward. The seatback folding mechanism 70 includes a biasing spring 71 illustrated in FIG. 12 and the locking mechanism 72 illustrated in FIG. 13.

The biasing spring 71 is used to bias the seatback 20 located at the sitting position forward, and is specifically a spiral spring which is provided in the seatback supporting unit 90. One end 71a of the biasing spring 71 is locked to the rotation shaft 20b of the seatback 20, and the other end 71b of the biasing spring 71 is locked to a locking pin 91 provided in the seatback supporting unit 90 in a protruding manner.

The locking mechanism 72 is attached to the side portion facing the outside of the vehicle 1 in the seatback frame 21 through a bracket (not illustrated). The locking mechanism 72 includes a locking piece 73 which engages with a striker 74 provided in the vehicle body, and holds the seatback 20 at the sitting position against the biasing force of the biasing spring 71 by the engagement between the locking piece 73 and the striker 74. Here, the vehicle body indicates a portion excluding the vehicle seat S1 in the vehicle 1.

Figure 13:
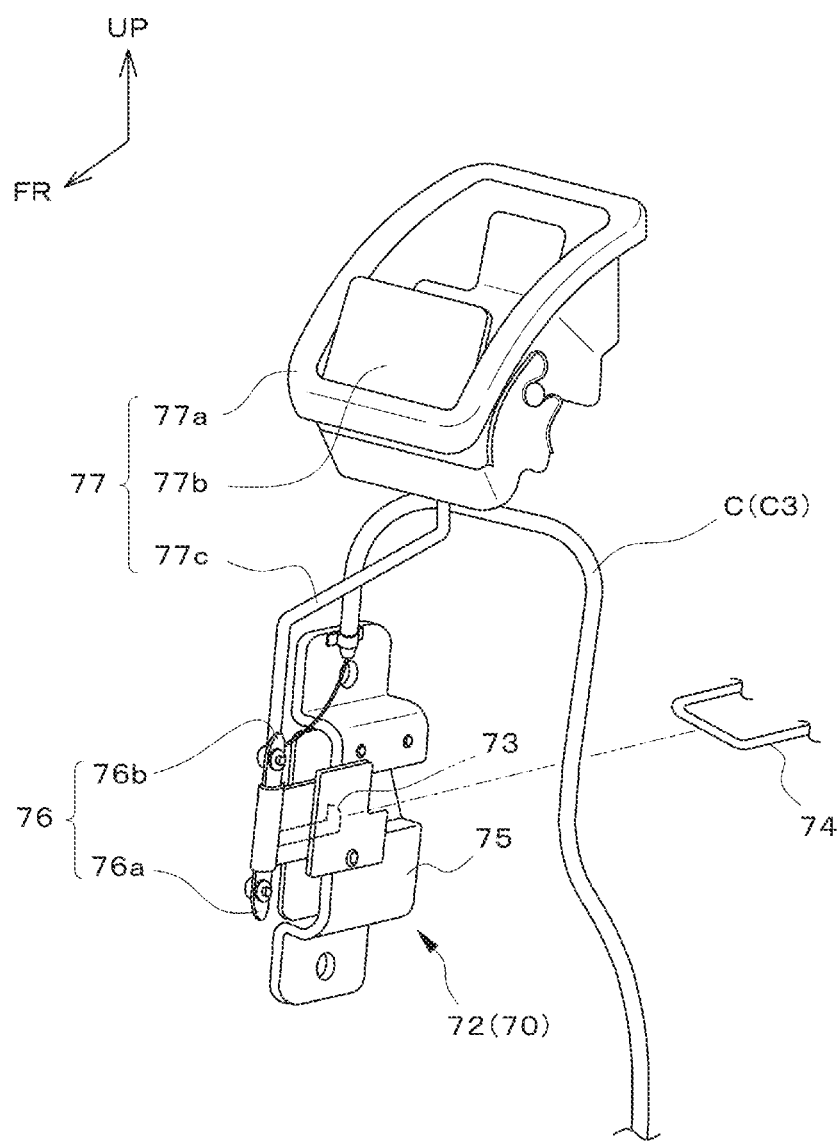
FIG. 13 is a perspective view of a locking mechanism 72 and an operation unit 77.

The configuration of the locking mechanism 72 will be described in more detail. As illustrated in FIG. 13, the locking mechanism 72 includes the locking piece 73, a base portion 75, and a connection portion 76. As described above, the locking piece 73 is a hook shaped member that engages with the striker 74, and is rotatably supported by the base portion 75. Here, the locking piece 73 rotates about a support shaft (not illustrated) uprightly formed in the base portion 75 to move between a position (engageable position) where the locking piece may engage with the striker 74 and a position (non-engageable position) where the locking piece may not engage with the striker 74.

Furthermore, the locking piece 73 is biased by a torsional spring (not illustrated) in a direction in which the locking piece faces the engageable position in the rotation direction. When the locking piece 73 is rotated from the engageable position to the non-engageable position against the biasing force of the torsional spring, the engagement state between the locking piece 73 and the striker 74 may be released.

The connection portion 76 is formed as an oval metal sheet, and is attached to the base portion 75 to be slidable along the up and down direction. When the locking piece 73 is attached to a lower end 76a (one end) of the connection portion 76 and the connection portion 76 slides upward, the locking piece 73 rotates in a direction facing the non-engageable position. Further, an upper end 76b (the other end) of the connection portion 76 is connected with a connecting rod 77c of the operation unit 77 to be described later and the cable C extending from the arranging unit 80.

In the seatback folding mechanism 70 with the above-described configuration, when the locking piece 73 engages with the striker 74, the seatback 20 is held at the sitting position against the biasing force of the biasing spring 71. When the locking piece 73 rotates from the engageable position toward the non-engageable position in accordance with the upward sliding movement of the connection portion 76, the engagement between the locking piece 73 and the striker 74 is released. For this reason, the seatback 20 rotates about the rotation shaft 20b to be folded forward by the biasing force of the biasing spring 71, and finally reaches the folding position.

Furthermore, in this embodiment, a damper mechanism (not illustrated) is provided in the seatback supporting unit 90, and when the folding angle of the seatback 20 reaches a predetermined angle, the folding speed (rotating speed) gradually decreases by the operation of the damper mechanism. Accordingly, since the seatback 20 reaches the folding position at a gentle speed, it is possible to prevent an accident caused by the collision with the seatback 20 even when the seatback 20 is folded while a person or an object exists between the seatback 20 and the vehicle body floor 2.

In this embodiment, there are prepared two paths that apply a driving force for sliding the connection portion 76 upward to the connection portion (in other words, a driving force for rotating the locking piece 73 toward the non-engageable position). One path is a path that receives an operation performed by the passenger to independently fold only the seatback 20 forward and transmits the operation to the locking piece 73 through the connection portion 76.

Specifically, the upper end of the seatback 20 is provided with the operation unit 77 that receives an operation performed by the passenger to independently fold only the seatback 20 forward. Furthermore, in the upper end surface of the seatback 20, the arrangement position of the operation unit 77 is located at the outside of the vehicle 1 in relation to the belt shaped member ST1 when viewed from the headrest 30 (see FIG. 2). As illustrated in FIG. 13, the operation unit 77 includes the operation cover 77a and the operation lever 77b which is rotatably supported by the operation cover 77a. The operation cover 77a has a concave shape in which the operation lever 77b may be accommodated. Then, the operation cover 77a is fixed to the seatback 20 while its flange abuts against the upper end surface of the seatback 20. More specifically, the operation cover is fixed to the attachment bracket 27 (see FIG. 5) provided at the shoulder position of the seatback frame 21.

The operation lever 77b is biased in a direction (specifically, a direction facing forward inside the operation cover 77a) in which the operation lever is accommodated inside the operation cover 77a in the rotation direction of the operation lever 77b by a biasing mechanism (not illustrated). Further, the connecting rod 77c which is formed by a metal member substantially formed in a zigzag shape is connected to a predetermined position of the operation lever 77b. The connecting rod 77c moves upward along with the upward rotation of the operation lever 77b (specifically, the rearward rotation of the operation lever 77b inside the operation cover 77a).

In the operation unit 77 with the above-described configuration, when the passenger rotates the operation lever 77b upward, the connecting rod 77c moves upward so that the above-described operation is transmitted to the connection portion 76 as a driving force for sliding the connection portion 76 upward. Finally, the upward sliding movement of the connection portion 76 is transmitted to the locking piece 73, and the locking piece 73 rotates toward the non-engageable position against the biasing force of the torsional spring. Accordingly, the engagement state of the locking piece 73 which engages with the striker 74 so far is released. As a result, the seatback 20 rotates to be independently folded forward by receiving the biasing force of the biasing spring 71. As described above, when the passenger rotates the operation lever 77b upward, the seatback 20 is independently folded forward.

Furthermore, when the engagement between the locking piece 73 and the striker 74 is released, the locking piece 73 is maintained in a state where the engagement with the striker 74 may not be performed until the locking piece rotates in the opposite direction to return to the engageable position.

The other path which applies a driving force for sliding the connection portion 76 is a path which receives an operation performed by the passenger to store the vehicle seat S1 and transmits the operation to the connection portion 76. That is, this path is used to transmit such an operation for flipping up the seat cushion 10 to the flip-up position when storing the vehicle seat S1 to the connection portion 76.

Specifically, as described in the section of the headrest rotating mechanism, the vehicle seat S1 is provided with the storing operation belt shaped member ST2 which receives the operation of storing the vehicle seat S1. One end of the cable C is attached to the seat cushion flip-up mechanism 60 (more specifically, the link 121 of the movable unit 120), and the other end of the cable C is attached to the arranging unit 80 to be described later. Further, the other cable C extends from the arranging unit 80, and its front end is connected to the upper end 76b of the connection portion 76.

Under the above-described configuration, when the passenger pulls the storing operation belt shaped member ST2, the seat cushion flip-up mechanism 60 is operated, and the seat cushion 10 flips up toward the flip-up position. Then, the flip-up operation is transmitted to the connection portion 76 through the cable C and the arranging unit 80. Specifically, when the flip-up operation is performed by the seat cushion flip-up mechanism 60, the cable C attached to the seat cushion flip-up mechanism 60 is pulled, and the arranging unit 80 is operated by the operation of pulling the cable C so that the cable C locked to the upper end 76b of the connection portion 76 is pulled by the operation of the arranging unit 80.

By the above-described series of operations, finally, the connection portion 76 slides upward, and the locking piece 73 rotates toward the non-engageable position. Then, as in the case of the operation unit 77, the engagement state of the locking piece 73 engaging with the striker 74 so far is released, and the seatback 20 is folded forward to rotate to the position of the seat cushion 10 before the flip-up operation. Then, the locking piece 73 rotates in the opposite direction, and is maintained in a state where the locking piece may not engage with the striker 74 until the locking piece returns to the engageable position.

Arranging Unit

Next, the arranging unit 80 will be described.

The arranging unit 80 is a device which interlocks the operation for folding the seatback 20 forward and the operation for folding the headrest 30 forward with the operation of flipping up the seat cushion 10 when storing the vehicle seat S1.

Specifically, the arranging unit 80 is operated to swing the locking member 53 of the headrest rotating mechanism 50 toward the release position and rotate the locking piece 73 of the seatback folding mechanism 70 toward the non-engageable position by using a driving force as an operation of rotating the link 121 of the seat cushion flip-up mechanism 60 as the operation performed to flip up the seat cushion 10. In other words, the arranging unit 80 is a device which transmits the operation of rotating the link 121 of the seat cushion flip-up mechanism 60 to the headrest rotating mechanism 50 and the seatback folding mechanism 70 to operate these mechanisms.

In order to realize the above-described function, the arranging unit 80 is connected to each of the link 121 of the seat cushion flip-up mechanism 60, the slide member 54 of the headrest rotating mechanism 50, and the connection portion 76 of the seatback folding mechanism 70 through the cable C as the transmitting member. Further, the arranging unit 80 is connected to the folding angle detecting mechanism 130 (the folding angle detecting mechanism 130 will be described later) by the cable C as the transmitting member. That is, four cables C extend from the arranging unit 80.

Furthermore, in the description below, for convenience of description, the cable connected to the link 121 of the seat cushion flip-up mechanism 60 is referred to as a first cable C1, the cable connected to the slide member 54 of the headrest rotating mechanism 50 is referred to as a second cable C2, the cable connected to the connection portion 76 of the seatback folding mechanism 70 is referred to as a third cable C3, and the cable connected to the folding angle detecting mechanism 130 is referred to as a fourth cable C4, in order to distinguish the four cables C extending from the arranging unit 80.

In this embodiment, as illustrated in FIG. 5, the arranging unit 80 is fixed to a portion slightly close to the outside of the vehicle 1 in relation to the center in the width direction of the seatback 20 in the front surface of the pan frame 22 constituting the seatback frame 21 by a bolt. The attachment of the arranging unit 80 will be described later in detail.

Figure 14:
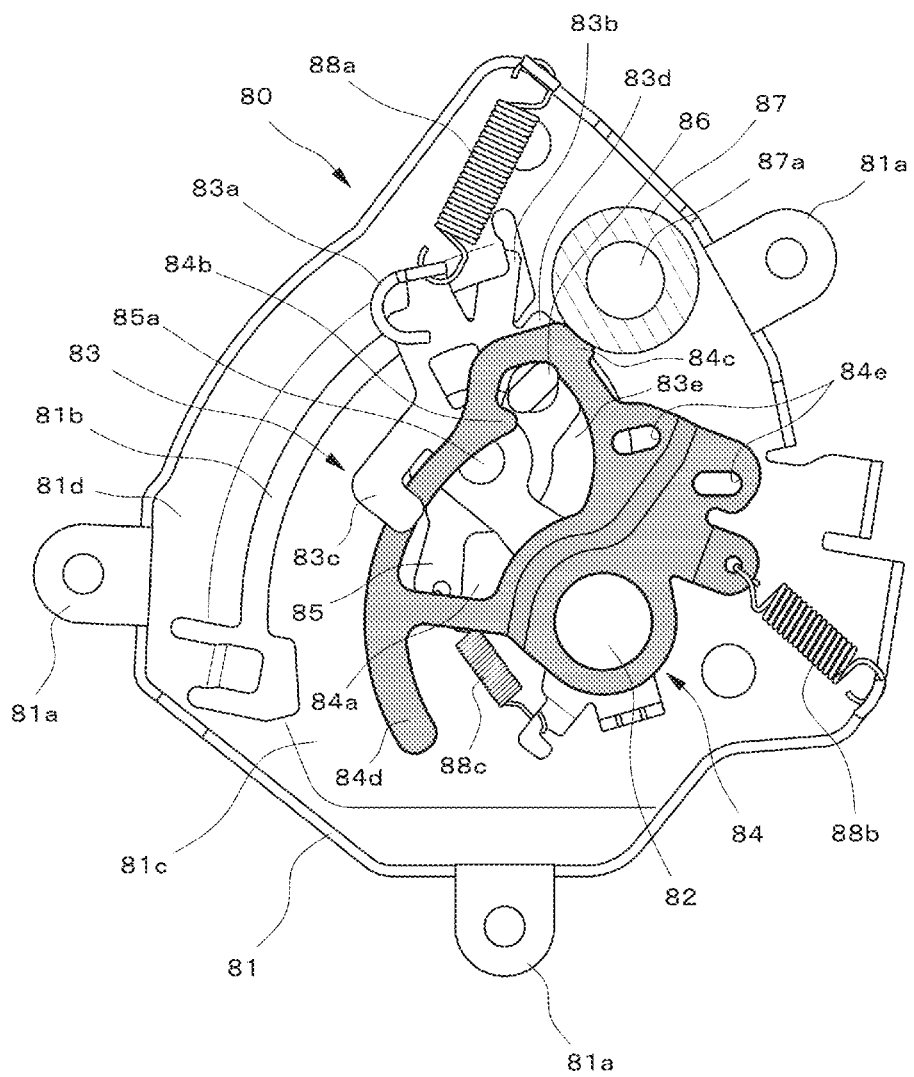
FIG. 14 is a diagram illustrating an arranging unit 80 when viewed from the rear side thereof.

The specific configuration of the arranging unit 80 will be described. As illustrated in FIG. 14, the arranging unit 80 mainly includes a casing 81, a rotation shaft 82, a first rotating member 83, a second rotating member 84, a third rotating member 85, an engagement pin 86, a cushioning rubber 87, a first coil spring 88a, a second coil spring 88b, and a third coil spring 88c. Further, as described above, the arranging unit 80 is connected to the seat cushion flip-up mechanism 60 by the first cable C1, is connected to the headrest rotating mechanism 50 by the second cable C2, is connected to the seatback folding mechanism 70 by the third cable C3, and is connected to the folding angle detecting mechanism 130 to be described later by the fourth cable C4. Hereinafter, the respective components will be described.

The casing 81 has a substantially fan shaped outer shape in a top view, and is provided at the front side of the operation portion of the arranging unit 80 (specifically, the first rotating member 83, the second rotating member 84, the third rotating member 85, and the like) to cover the operation portion. Further, the casing 81 includes an attachment hole (not illustrated in FIG. 14) which is formed to attach the rotation shaft 82.

Further, a circular-arc guide slit 81b is formed in a portion close to the outer edge of the casing 81. The guide slit 81b serves as a guide portion when the first rotating member 83 rotates, and is formed along the rotation direction of the first rotating member 83. Furthermore, in this embodiment, a step is formed at the formation position of the guide slit 81b, and a center region 81c of the casing 81 adjacent to the guide slit 81b is slightly recessed to the back side in relation to the outer region 81d located at the outside in relation to the guide slit 81b in the thickness direction of the casing 81.

The rotation shaft 82 is a member that rotatably supports the first rotating member 83 and the second rotating member 84, and is detachably attached to the casing 81. Furthermore, in this embodiment, the attachment portion of the rotation shaft 82 in the rear surface of the casing 81 is raised by one level from the periphery thereof, and forms a pedestal (not illustrated) of the rotation shaft 82. The first rotating member 83 is a metal sheet member that rotates about the rotation shaft 82, and extends from the rotation shaft 82 toward the guide slit 81b. One end (the end near the guide slit 81b) in the extension direction of the first rotating member 83 is provided with a cable locking portion 83a which locks one end of the first cable C1 and a tongue shaped portion 83b which passes through the guide slit 81b and goes around from the rear surface of the casing 81 to the front surface thereof.

Further, a tongue shaped engagement portion 83c which extends from the side portion of the first rotating member 83 and engages with the surface of the second rotating member 84 (specifically, the surface of the outermost edge 84d of the second rotating member 84) is provided at the halfway position of the first rotating member 83 in the extension direction. Furthermore, the first coil spring 88a is attached to one end of the first rotating member 83 in the extension direction, and the first coil spring 88a biases the first rotating member 83 toward one end position in its rotation range (specifically, a position where the first rotating member 83 is normally located).

With the above-described configuration, the first rotating member 83 is normally biased by the first coil spring 88a, and is located at one end position in its rotation range. When the first cable C1 is pulled toward the link 121 by the rotation of the link 121 of the seat cushion flip-up mechanism 60, one end of the first rotating member 83 in the extension direction is pulled through the cable locking portion 83a so that the first rotating member 83 rotates from one end position toward the other end position in the rotation range against the biasing force of the first coil spring 88a.

Furthermore, when the first rotating member 83 rotates, the tongue shaped portion 83b of the first rotating member 83 moves inside the guide slit 81b along the guide slit 81b, and the tongue shaped engagement portion 83c of the first rotating member 83 moves on the surface of the second rotating member 84 along the surface. Accordingly, the first rotating member 83 may appropriately rotate within the set rotation range.

Precisely, the first coil spring 88a is attached to and the first cable C1 is connected to a position (specifically, one end in the extension direction) slightly separated from the rotation shaft 82 as a support point in the first rotating member 83. For this reason, there is a possibility that the first rotating member 83 may be buckled so that its extension direction is curved, and the first rotating member may not easily rotate in the appropriate rotation range when the buckling is generated. In order to prevent such an accident, in this embodiment, the casing 81 is provided with the guide slit 81b, the tongue shaped portion 83b of the first rotating member 83 passes through the guide slit 81b, and the tongue shaped engagement portion 83c of the first rotating member 83 engages with the outermost edge 84d of the second rotating member 84 and moves on the surface of the second rotating member 84. Accordingly, since the buckling of the first rotating member 83 is regulated, the first rotating member may appropriately rotate in the set rotation range.

Furthermore, a portion of the first rotating member 83 located at the halfway position in the extension direction is provided with a protrusion portion 83d which slightly protrudes more than the other portions. The protrusion portion 83d is a portion which collides with the cushioning rubber 87 to be described later when the first rotating member 83 returns from the other end position to one end position in the rotation range by the biasing force of the first coil spring 88a. Further, a circular-arc hole (hereinafter, a circular-arc hole 83e) is formed at the halfway position of the first rotating member 83 in the extension direction, and the engagement pin 86 to be described later passes through the circular-arc hole 83e. Furthermore, an attachment hole (not illustrated) for attaching the rotation shaft 85a of the third rotating member 85 is formed in the vicinity of the circular-arc hole 83e.

The second rotating member 84 is a substantially fan shaped metal sheet member that overlaps the first rotating member 83 at the opposite side to the casing 81 (the second rotating member overlaps on the first rotating member 83 in the state illustrated in FIG. 14) and rotates about the rotation shaft 82. The outer edge of the second rotating member 84 is provided with a connection hole 84e for connecting the ends of the second cable C2 and the third cable C3. Then, when the second rotating member 84 rotates from one end position toward the other end position in its rotation range, the two cables C are pulled.

Further, the second coil spring 88b is attached to the vicinity of the connection position of the second cable C2 and the third cable C3 in the outer edge of the second rotating member 84. The second coil spring 88b biases the second rotating member 84 toward one end position (specifically, a position where the second rotating member 84 is normally located) in its rotation range.

Further, the second rotating member 84 is provided with a guide hole 84a, through which the engagement pin 86 to be described later passes, formed along the rotation direction of the second rotating member 84. The guide hole 84a has a width sufficiently larger than the outer diameter of the engagement pin 86. Particularly, the width of the end of the guide hole 84a located at one end in the rotation direction of the second rotating member 84 is larger than the width of the other portion. That is, in this embodiment, a step is formed at a position close to one end of the guide hole 84a in the rotation direction of the second rotating member 84. In other words, a convex portion 84b which protrudes toward the inside of the guide hole 84a is formed at one end of the second rotating member 84 in the edge of the guide hole 84a in the rotation direction of the second rotating member 84.

The engagement pin 86 is uprightly formed in the third rotating member 85 to be described later, and moves along with the third rotating member 85. Then, the engagement pin 86 is locked to the convex portion 84b to engage with the second rotating member 84, and moves inside the guide hole 84a while climbing over the convex portion 84b to release the engagement state with the second rotating member.

The second rotating member 84 with the above-described configuration is normally biased by the second coil spring 88b to be located at one end position in the rotation range. The engagement pin 86 is located at the side portion of the convex portion 84b (more specifically, on end side in relation to the convex portion 84b in the rotation direction of the second rotating member 84). Then, when the engagement pin 86 moves inside the guide hole 84a to be locked to the convex portion 84*b*, the second rotating member 84 is pressed from one end position toward the other end position in its rotation range by the engagement pin 86. By the pressing force of the engagement pin 86, the second rotating member 84 rotates toward the other end position in the rotation range against the biasing force of the second coil spring 88*b* so that the second cable C2 and the third cable C3 are pulled.

When the engagement pin 86 moves inside the guide hole 84*a* to climb over the convex portion 84*b*, the engagement between the second rotating member 84 and the engagement pin 86 is released. Accordingly, the second rotating member 84 is released from the pressing by the engagement pin 86 and is biased by the second coil spring 88*b* to return to one end position in the rotation range.

Furthermore, a protrusion portion 84*c* is formed at a position located at one end of the second rotating member 84 in the rotation direction in the outer edge of the second rotating member 84. The protrusion portion 84*c* is a portion that collides with the cushioning rubber 87 to be described later when the second rotating member 84 returns from the other end position toward one end position in the rotation range by the biasing force of the second coil spring 88*b*. Further, in the second rotating member 84, the outermost edge 84*d* farthest from the rotation shaft 82 is formed in a circular-arc shape, and its surface is provided with the tongue shaped engagement portion 83*c* of the first rotating member 83. Then, the tongue shaped engagement portion 83*c* engages with the outermost edge 84*d* and moves along the surface of the outermost edge 84*d*.

The third rotating member 85 is a metal sheet member that is substantially formed in a gourd bowl shape and rotates about the rotation shaft 85*a* attached to the first rotating member 83. The third rotating member 85 overlaps the first rotating member 83 at the position of the casing 81 (the third rotating member overlaps beneath the first rotating member 83 in the state illustrated in FIG. 14), and the columnar engagement pin 86 is uprightly formed on the surface thereof. The engagement pin 86 passes through the circular-arc hole 83*e* formed in the first rotating member 83, and passes through the guide hole 84*a* of the second rotating member 84.

Further, the third coil spring 88*c* is attached to one end of the third rotating member 85. The other end of the third coil spring 88*c* is locked to the other end (the end near the position of the rotation shaft 82) of the first rotating member 83 in the extension direction, and biases the third rotating member 85 so that the outer peripheral surface of the engagement pin 86 abuts against the inner edge of the circular-arc hole 83*e*. The third rotating member 85 rotates relative to the first rotating member 83 by the biasing force of the third rotating member 85, and the outer peripheral surface of the engagement pin 86 is normally pressed against the inner edge of the circular-arc hole 83*e*. When the first rotating member 83 rotates in such a state, the third rotating member 85 and the engagement pin 86 rotate along with the first rotating member 83.

Figure 15A:
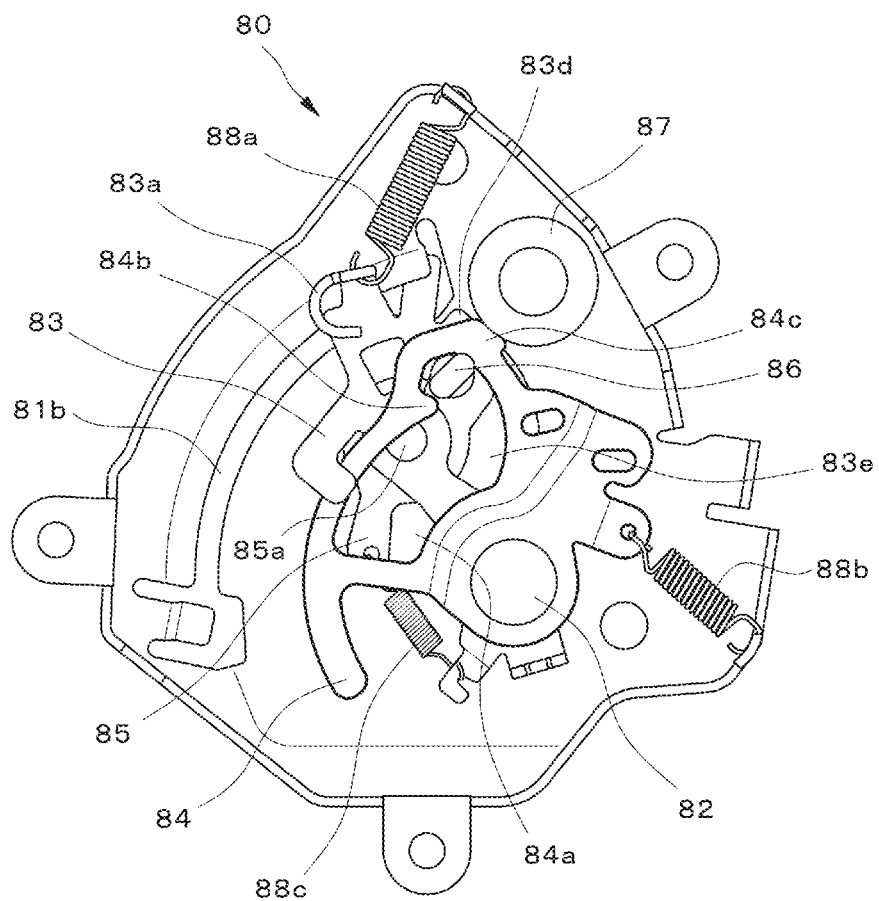
FIG. 15A is a (first) side view diagram illustrating an operation example of the arranging unit 80.
Figure 15B:
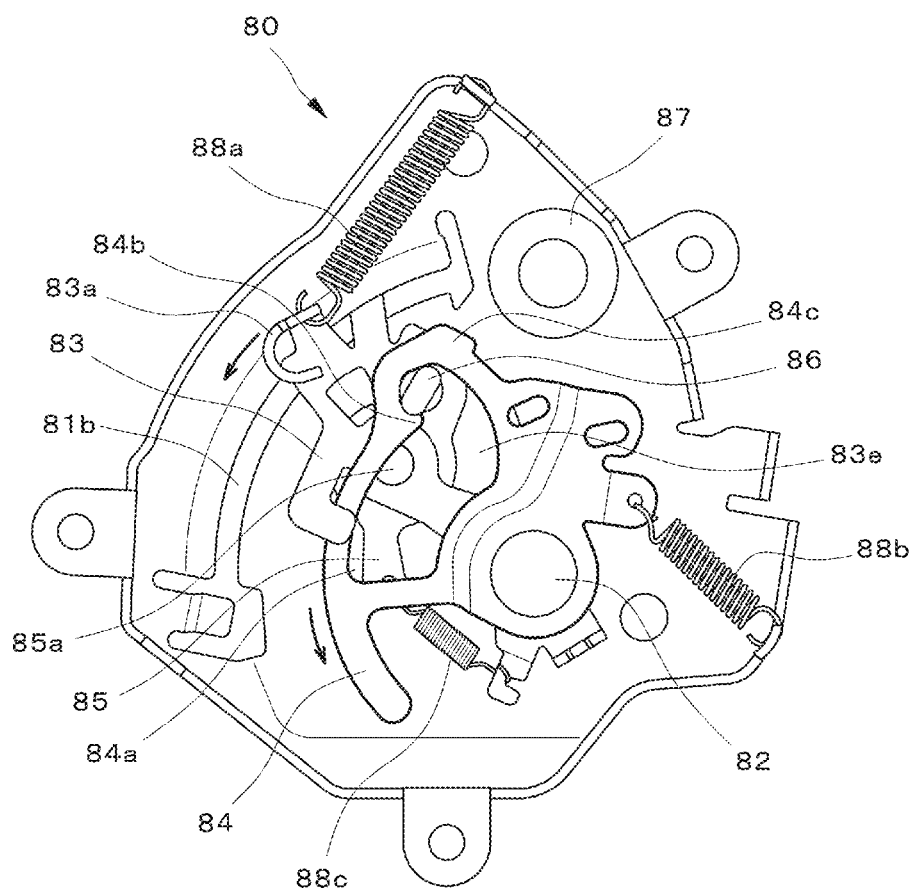
FIG. 15B is a (second) side view diagram illustrating an operation example of the arranging unit 80.

Further, when the third rotating member 85 rotates along with the first rotating member 83 from one end position toward the other end position in the rotation range (in other words, toward the same direction as the direction in which the first rotating member 83 rotates against the biasing force of the first coil spring 88*a*), the engagement pin 86 is locked to the convex portion 84*b* of the second rotating member 84 and engages with the second rotating member 84 (see FIG. 15B). Accordingly, the engagement pin 86 presses the second rotating member 84 from one end position toward the other end position in the rotation range. That is, in the arranging unit 80 of this embodiment, when the first rotating member 83 rotates while the second rotating member 84 engages with the engagement pin 86, the engagement pin 86 presses the second rotating member 84 by using the rotation of the first rotating member 83, and rotates the second rotating member 84 from one end position toward the other end position in the rotation range against the biasing force of the second coil spring 88*b*.

The fourth cable C4 is connected to the front end of the engagement pin 86, and the fourth cable C4 is connected to the folding angle detecting mechanism 130 as described above (see FIG. 5). When the seatback 20 is folded forward, the engagement pin 86 is pulled toward the vehicle body floor 2. Here, the folding angle detecting mechanism 130 includes a locking portion (not illustrated) of which one end is locked to the vehicle body floor 2, and the other end of the locking portion is fixed to the seatback frame 21. Then, the folding angle detecting mechanism 130 is a mechanism that pulls the engagement pin 86 toward the vehicle body floor 2 through the fourth cable C4 along with the operation in which the seatback 20 is folded forward.

The pulling force in which the folding angle detecting mechanism 130 pulls the engagement pin 86 increases with an increase in the folding angle of the seatback 20, and exceeds the locking force between the engagement pin 86 and the convex portion 84*b* of the second rotating member 84 when the folding angle reaches a predetermined angle. In such a state, the third rotating member 85 rotates relative to the first rotating member 83 by the pulling force of the fourth cable C4 so that the engagement pin 86 climbs over the apex of the convex portion 84*b*.

Furthermore, the predetermined angle may be arbitrarily set. For example, the predetermined angle may be set by adjusting the cable length of the fourth cable C4, the shape of the convex portion 84*b*, and the installation position of the folding angle detecting mechanism 130.

Then, when the engagement pin 86 climbs over the apex of the convex portion 84*b*, the second rotating member 84 is released from the pressing of the engagement pin 86 and is biased by the second coil spring 88*b* to return to one end position in the rotation range. Furthermore, when the engagement pin 86 climbs over the apex of the convex portion 84*b*, the third rotating member 85 rotates again along with the first rotating member 83. Accordingly, the engagement pin 86 moves along the inner edge of the guide hole 84*a* while facing the opposite side to the position of the convex portion 84*b*.

The cushioning rubber 87 is a damper which abuts against the protrusion portion 83*d* of the first rotating member 83 or the protrusion portion 84*c* of the second rotating member 84 to reduce the impact applied to the respective rotating members when the first rotating member 83 and the second rotating member 84 are biased by the respectively corresponding coil springs 88*a* and 88*b* to return to one end position in the rotation range (in the normal position). The cushioning rubber 87 is formed in a cylindrical shape, and is supported by a support shaft 87*a* uprightly formed on the rear surface of the casing 81. Furthermore, the cushioning rubber 87 according to this embodiment is formed of a rigid rubber material to suppress a collision sound generated by the collision of the first rotating member 83 and the second rotating member 84.

The operation examples of the respective components of the arranging unit 80 with the above-described configuration will be described by referring to FIGS. 15A to 15D.

In a normal state (when the posture of the vehicle seat S1 is maintained in the sitting posture), as illustrated in FIG. 15A, the first rotating member 83, the second rotating member 84, and the third rotating member 85 are respectively biased by the corresponding springs of the first coil spring 88*a*, the second coil spring 88*b*, and the third coil spring 88*c* to be located at the initial positions.

Here, the initial position of the first rotating member 83 is one end position in the rotation range, and is specifically a position in which the protrusion portion 83d of the first rotating member 83 abuts against the cushioning rubber 87. Similarly, the initial position of the second rotating member 84 is one end position in the rotation range and is specifically a position in which the protrusion portion 84c of the second rotating member 84 abuts against the cushioning rubber 87. The initial position of the third rotating member 85 is a position in which the engagement pin 86 is pressed against the inner edge of the circular-arc hole 83e formed in the first rotating member 83 and is disposed at one end side of the second rotating member 84 in the rotation direction in the guide hole 84a formed in the second rotating member 84.

If the flip-up operation using the seat cushion flip-up mechanism 60 is performed when the respective rotating members 83, 84, and 85 are present at the respective initial positions, the first cable C1 is pulled toward the link 121 by the rotation of the link 121 connected with the first cable C1. As a result, the first rotating member 83 rotates toward the other end position in the rotation range against the biasing force of the first coil spring 88a. At this time, since the engagement pin 86 is pressed against the inner edge of the circular-arc hole 83e of the first rotating member 83, the third rotating member 85 rotates along with the first rotating member 83.

When the third rotating member 85 rotates along with the first rotating member 83, the engagement pin 86 moves inside the guide hole 84a formed in the second rotating member 84, and is locked to the convex portion 84b to engage with the second rotating member 84 as illustrated in FIG. 15B. Then, when the first rotating member 83 rotates further toward the other end position in the rotation range, the engagement pin 86 presses the second rotating member 84. The second rotating member 84 rotates from one end position toward the other end position in the rotation range against the biasing force of the second coil spring 88b by the pressing force of the engagement pin 86. The second cable C2 and the third cable C3 are pulled by the second rotating member 84.

When the third cable C3 is pulled, the locking piece 73 of the locking mechanism 72 rotates to the non-engageable position as described above so that the engagement state between the locking piece 73 and the striker 74 is released. As a result, the seatback 20 is folded forward by receiving the biasing force of the biasing spring 71. When the seatback 20 is folded forward, the fourth cable C4 connected to the engagement pin 86 is pulled toward the vehicle body floor 2 by the folding angle detecting mechanism 130, and the pulling force gradually increases with an increase in the folding angle of the seatback 20.

Figure 15C:
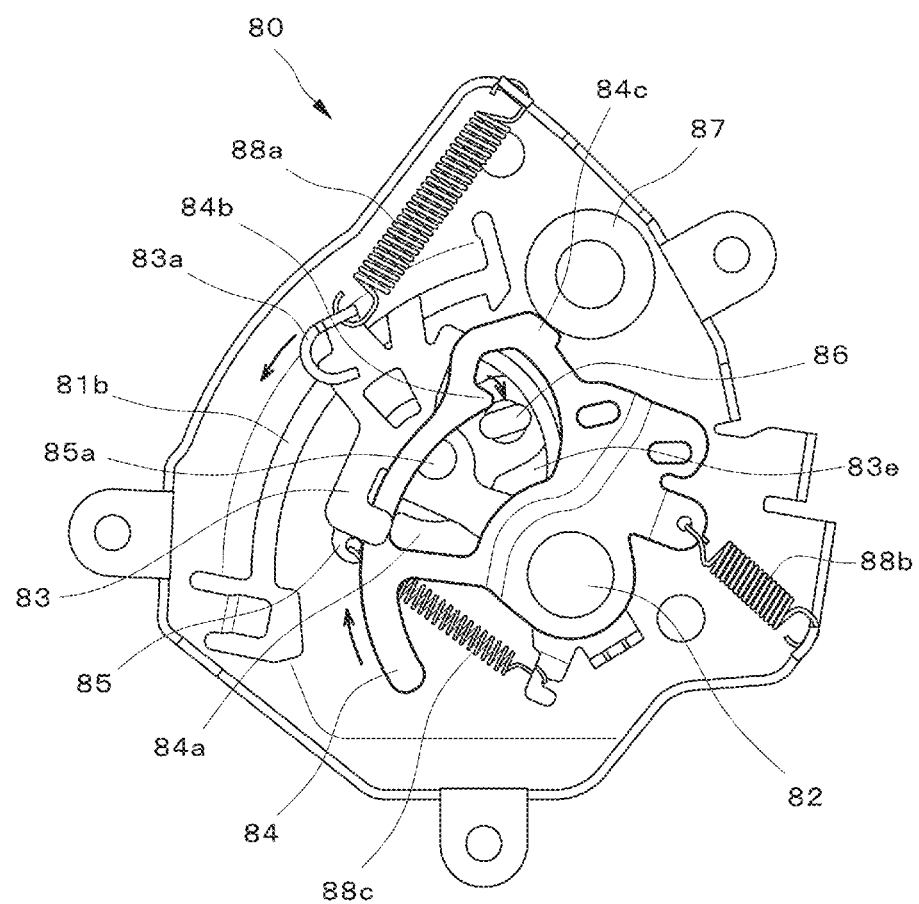
FIG. 15C is a (third) side view diagram illustrating an operation example of the arranging unit 80.
Figure 15D:
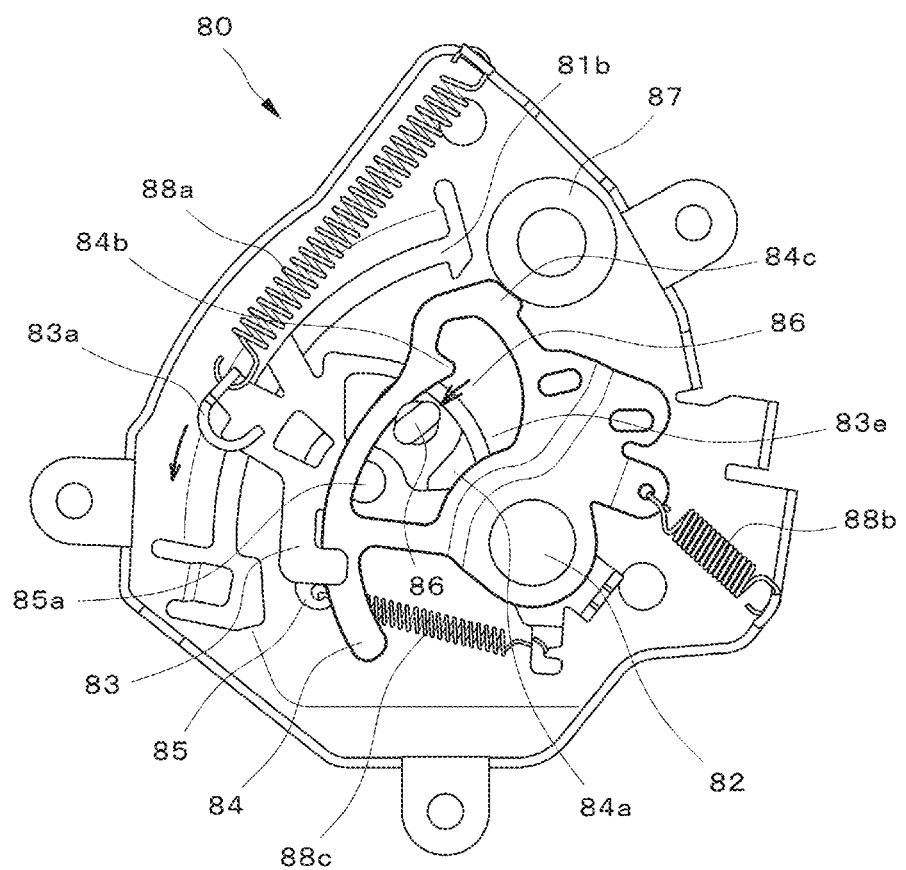
FIG. 15D is a (fourth) side view diagram illustrating an operation example of the arranging unit 80.

Then, when the folding angle of the seatback 20 reaches a predetermined angle, the pulling force acting on the engagement pin 86 exceeds the locking force of the engagement pin 86 and the convex portion 84b of the second rotating member 84. In such a state, the third rotating member 85 rotates relative to the first rotating member 83 against the biasing force of the third coil spring 88c by the pulling force of the fourth cable C4. By the relative rotation of the third rotating member 85, the engagement pin 86 climbs over the apex of the convex portion 84b as illustrated in FIG. 15C. Accordingly, the engagement state between the engagement pin 86 and the second rotating member 84 is released, and the second rotating member 84 returns to one end position (that is, the initial position) in the rotation range by the biasing force of the second coil spring 88b.

Furthermore, the third rotating member 85 rotates again along with the first rotating member 83 after the engagement pin 86 climbs over the apex of the convex portion 84b. Accordingly, the engagement pin 86 moves along the inner edge of the guide hole 84a formed in the second rotating member 84 while facing the opposite side to the position of the convex portion 84b (see FIG. 15D).

When the second rotating member 84 returns to one end position in the rotation range, the pulling of the second cable C2 and the third cable C3 by the second rotating member 84 is released. Accordingly, the locking piece 73 of the locking mechanism 72 rotates to return from the non-engageable position to the engageable position.

That is, in this embodiment, since the engagement pin 86 is continuously locked to the convex portion 84b of the second rotating member 84 until the seatback 20 is folded forward and the folding angle reaches a predetermined angle, the second rotating member 84 continuously pulls the third cable C3 so that the locking piece 73 connected to the third cable C3 stays at the non-engageable position. That is, since the locking piece 73 is located at the non-engageable position even when the passenger performs an operation of raising the seatback 20 until the seatback 20 is folded forward and the folding angle reaches a predetermined angle, the locking piece 73 may not engage with the striker 74 to fix the seatback 20 to the sitting position again.

When the folding angle of the seatback 20 reaches a predetermined angle and the engagement pin 86 climbs over the convex portion 84b, the engagement between the engagement pin 86 and the second rotating member 84 is released so that the second rotating member 84 returns to one end position in the rotation range. Accordingly, the second rotating member 84 does not pull the third cable C3 later so that the locking piece 73 connected to the third cable C3 is located at the engageable position again. That is, when the passenger performs an operation of raising the seatback 20 after the folding angle of the seatback 20 reaches a predetermined angle, the locking piece 73 engages with the striker 74. Accordingly, the seatback 20 may be fixed (relocked) to the sitting position again.

As described above, in this embodiment, it is possible to perform a returning operation (cancel operation) for returning the seatback 20 of which the engagement with the striker 74 fixed to the vehicle body is released to a state in which the seatback may engage with the striker 74 while performing the operation of storing the vehicle seat S1 by the above-described configuration. Then, in this embodiment, the returning operation is performed in response to the folding angle when folding the seatback 20 forward. More specifically, the returning operation is performed when the folding angle reaches a predetermined angle.

Next, the attachment of the arranging unit 80 will be described. In this embodiment, the respective components of the arranging unit 80 are not individually attached, but are integrally attached as a unit to the pan frame 22. Here, the attachment stud bolt Bs is attached to the front surface of the pan frame 22 in the previous step of the attachment of the arranging unit 80. A plurality of bolt receiving portions 81a are provided in the casing 81 of the arranging unit 80 at an appropriate interval along the outer periphery thereof.

Then, when attaching the arranging unit 80 to the pan frame 22, the arranging unit 80 is attached from the front surface side of the pan frame 22 to the bolt hole formed in the bolt receiving portion 81a through the stud bolt Bs. In this way, in this embodiment, the arranging unit 80 may be attached as one unit, and may be attached from the front surface side of the pan frame 22. Accordingly, the arranging unit 80 may be easily attached, and hence the assembling workability is improved.

Furthermore, in this embodiment, there are three installation positions of the bolt receiving portion 81a (in other words, the positions in which the arranging unit 80 is fixed to the pan frame 22), and the respective installation positions are set to be located at the apexes of the triangle. Here, in the triangular region having the apexes as the installation positions of the bolt receiving portions 81a, the operations of the members arranged within the region may be stabilized. Accordingly, when the engagement pin 86 is disposed within the region and the movable range of the engagement pin 86 is set within the region, the engagement pin 86 is stably operated.

Further, in this embodiment, one installation position of the bolt receiving portion 81a is located near the cushioning rubber 87. In other words, the operation portions (specifically, the first rotating member 83 and the second rotating member 84) collide with the cushioning rubber 87 in the vicinity of the fixation position of the arranging unit 80. In this way, since the fixation position of the arranging unit 80 exists in the vicinity of the position where the collision between the members occurs, a variation in the arrangement position of the arranging unit 80 is suppressed even when the collision occurs. Accordingly, the arranging unit 80 may be stably disposed on the pan frame 22. Furthermore, in order to further effectively exhibit the above-described effect, it is more desirable that the arrangement position of the support shaft 87a of the cushioning rubber 87 be disposed on the line connecting the collision position between the operation portion and the cushioning rubber 87 to the installation position of the bolt receiving portion 81a.

Further, in this embodiment, the arranging unit 80 is attached to the substantial center in the up and down direction of the seatback frame 21. Accordingly, the operation stability of the respective components of the arranging unit 80 is improved.

Specifically, since the belt shaped member ST1 which receives the operation of independently folding the headrest 30 forward is provided at the upper end of the seatback 20, the headrest rotating mechanism 50, which is operated by the operation of pulling the belt shaped member ST1, is disposed in the vicinity of the upper end of the seatback 20. Further, it is desirable to dispose the arranging unit 80, which is operated to drive the headrest rotating mechanism 50, in the vicinity of the headrest rotating mechanism 50 (that is, the upper end of the seatback 20) from the viewpoint of the operation stability. The arranging unit 80 is used to transmit the flip-up operation performed by the seat cushion flip-up mechanism 60 to the headrest rotating mechanism 50 or the seatback folding mechanism 70. From this viewpoint, it is desirable to dispose the arranging unit in the vicinity of the seat cushion 10 (more precisely, the seat cushion flip-up mechanism 60), that is, the vicinity of the lower end of the seatback 20.

Due to the above-described circumstance, in this embodiment, the arranging unit 80 is attached to the middle position of the upper end and the lower end of the seatback frame 21, and hence the operation stability of the arranging unit 80 is improved.

Further, in this embodiment, from the viewpoint of the improvement in the operation stability, the arranging unit 80 is attached to the position near the outside of the vehicle 1 in the right and left direction (that is, the width direction of the seatback 20). This improves the operation stability by a configuration in which the end of the first cable C1 extending from the arranging unit 80 is attached to the link 121 located at the outside of the vehicle 1 among the pair of links 121 provided in the seat cushion flip-up mechanism 60 and the cable length is extremely shortened.

The attachment of the arranging unit 80 will be described further. In this embodiment, the reinforcing plate 26 for improving the rigidity of the pan frame 22 is attached to the position slightly close to the upper side in relation to the center of the pan frame 22 in the height direction (corresponding to the height direction of the seatback 20). Then, the arranging unit 80 is attached to a portion (that is, a portion with improved rigidity) provided with the reinforcing plate 26 in the pan frame 22 so that the arranging unit 80 is partially caught. Specifically, one of the attachment positions of the arranging unit 80 (that is, the installation positions of the bolt receiving portions 81a) is located on the reinforcing plate 26.

As described above, the rigidity of the attachment position of the arranging unit 80 is improved. As a result, it is possible to stabilize the operation of the respective operation portions (specifically, the first rotating member 83 or the second rotating member 84) of the arranging unit 80. Accordingly, the function of the arranging unit 80 (the function of transmitting the flip-up operation performed by the seat cushion flip-up mechanism 60 to the headrest rotating mechanism 50 or the seatback folding mechanism 70) is appropriately exhibited.

Furthermore, the reinforcing plate 26 has an elongated rectangular shape along the width direction of the seatback 20, and one longitudinal end reaches the pipe frame 23 to be bonded to the pipe frame 23. Accordingly, the reinforcing effect obtained by the reinforcing plate 26 is improved, and hence the rigidity of the attachment position of the arranging unit 80 may be further improved.

Further, in this embodiment, the headrest rotating mechanism 50 is fixed to the pan frame 22 at the upper position of the arranging unit 80. In this way, since the arranging unit 80 and the headrest rotating mechanism 50 are arranged in parallel in the vertical direction, the rigidity of the pan frame 22 is further improved. In addition, the arranging unit 80 is attached to the pan frame 22 while the upper portion thereof reaches the reinforcing plate 26, and the headrest rotating mechanism 50 is attached to the pan frame 22 while the lower portion thereof reaches the reinforcing plate 26. That is, the reinforcing plate 26 is provided at a position sandwiched between the headrest rotating mechanism 50 and the arranging unit 80 in the up and down direction of the seatback frame 21. Accordingly, the rigidity of the pan frame 22 is further improved.

Next, the wiring path of each cable C extending from the arranging unit 80 will be described by referring to FIG. 5.

First, the respective cables C are all wired to be located inside the pipe frame 23. In other words, the shape of the pipe frame 23 and the arrangement position of the pipe frame 23 in the seatback frame 21 are designed to avoid the contact with the cable C. Accordingly, abnormal noise caused by the contact between the pipe frame 23 and the cable C is prevented.

Hereinafter, the wiring path for the cable C will be described in detail.

Among the cables C extending from the arranging unit 80, as illustrated in FIG. 5, the first cable C1 connected to the link 121 of the seat cushion flip-up mechanism 60 is wired to extend from the lower portion of the casing 81 of the arranging unit 80 and to pass through the substantial center portion of the pan frame 22 in the width direction of the seatback 20.

As illustrated in FIG. 5, the second cable C2 connected to the headrest rotating mechanism 50 is wired to extend from the side portion of the casing 81 of the arranging unit 80 (precisely, the side portion facing the outside of the vehicle 1) and be folded back so that the front end thereof is directed toward the slide member 54 of the headrest rotating mechanism 50.

As illustrated in FIG. 5, the third cable C3 connected to the seatback folding mechanism 70 is wired to extend from the side portion of the casing 81 of the arranging unit 80 (precisely, the side portion facing the outside of the vehicle 1) and to be directed toward the attachment bracket 27 provided at the shoulder position of the seatback frame 21. Then, the third cable C3 is folded back at the side of the attachment bracket 27, and the front end thereof is connected to the connection portion 76 of the seatback folding mechanism 70.

As illustrated in FIG. 5, the fourth cable C4 connected to the folding angle detecting mechanism 130 is wired to extend from the lower portion of the casing 81 of the arranging unit 80 and to pass through the side portion facing the outside of the vehicle 1 in the pan frame 22. Here, a portion which comes out from the arranging unit 80 and is connected to the folding angle detecting mechanism 130 in the fourth cable C4 is bent and stretched along with the operation for folding the seatback 20 (in FIG. 5, the fourth cable C4 is bent in a V-shape). That is, an extra length portion (so-called allowance) is provided at the halfway position of the fourth cable C4, and the bending and stretching operation (flapping operation) is performed in response to the folding operation of the seatback 20.

Figure 16:
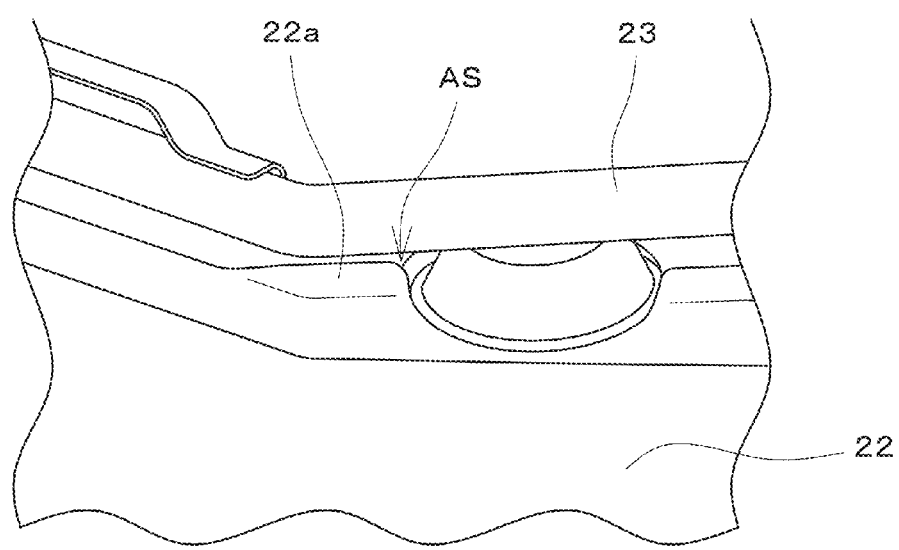

As described above, since the bending and stretching operation of the fourth cable C4 is performed on the surface of the seatback frame 21 (the cable flaps), there is a need to ensure a space for accommodating the fourth cable C4 even when the operation of bending and stretching the fourth cable C4 is performed in the seatback frame 21. For this reason, in this embodiment, as illustrated in FIG. 16, the wiring space AS is provided between the side portion facing the outside of the vehicle 1 in the pan frame 22 and the pipe frame 23 located on the side portion, and the fourth cable C4 is located inside the wiring space AS.

In this embodiment, since the wiring space AS is formed, even when the bending and stretching operation (particularly, the bending operation) of the fourth cable C4 is performed, the fourth cable C4 may be accommodated in the same space to appropriately wire the fourth cable C4. Further, since the wiring space AS is formed, the fourth cable C4 is located below the pipe frame 23 in the bent state, and hence the contact with the pipe frame 23 may be prevented. Accordingly, it is possible to suppress the abnormal noise caused by the contact between the cable C and the pipe frame 23.

Furthermore, the outer edge of the portion forming the wiring space AS in the pan frame 22 is provided with a cable returning wall 22a with an upright wall shape. Since the cable returning wall 22a is formed, it is possible to regulate the fourth cable C4 located inside the wiring space AS from protruding toward the outside of the seatback frame 21. Accordingly, the fourth cable C4 is appropriately wired on the pan frame 22.

Further, in this embodiment, the wiring space AS is provided at the end closer to the arranging unit 80, that is, the end facing the outside of the vehicle 1 among both ends in the width direction of the seatback 20. Accordingly, it is possible to further exhibit of the effect of the wiring space AS.

Specifically, as described above, the arranging unit 80 is attached to the position slightly close to the outside of the vehicle 1 in the width direction of the seatback 20. Further, there is a need to wire the fourth cable C4 extending from the arranging unit 80 to the folding angle detecting mechanism 130 as an extremely short path from the viewpoint of ensuring the operation stability. In consideration of the above-described circumstance, in this embodiment, the fourth cable C4 is wired to pass through the side portion facing the outside of the vehicle 1 in the pan frame 22. Thus, since the flapping of the fourth cable C4 occurs on the end facing the outside of the vehicle 1 in the pan frame 22, when the wiring space AS for absorbing the flapping may be provided at the end facing the outside of the vehicle 1, the effect may be further effectively exhibited.

Attachment Positions of Headrest Rotating Mechanism 50, First Driving Portion 140, and Second Driving Portion 150

As described above, in the vehicle seat S1 of this embodiment, the operation for folding the headrest 30 may be performed along with the operation of flipping up the seat cushion 10 to the flip-up position or the movement of the seatback 20 toward the folding position or may be independently performed. That is, the vehicle seat S1 according to this embodiment includes the first driving portion 140 which drives only the headrest rotating mechanism 50 by the operation of pulling the belt shaped member ST1 performed by the passenger, and the second driving portion 150 which drives the headrest rotating mechanism 50 along with the operation of flipping up the seat cushion 10 when the storing operation performed by the passenger is received by the storing operation belt shaped member ST2.

Here, the hooking rod 24 and one longitudinal end 54a of the slide member 54 as a main component of the first driving portion 140 are attached to the seatback frame 21. The arranging unit 80 and the extension portion 54b formed in the other longitudinal end of the slide member 54 as a main component of the second driving portion 150 are also attached to the seatback frame 21. That is, in this embodiment, the headrest rotating mechanism 50, the first driving portion 140, and the second driving portion 150 are all attached to the seatback frame 21.

With the above-described configuration, in this embodiment, the vehicle seat S1 with satisfactory assembling workability is realized. More specifically, the headrest rotating mechanism 50, the first driving portion 140, and the second driving portion 150 are all attached to the seatback frame 21, and the operation for folding the headrest 30 forward is performed on the seatback frame 21. That is, there is no need to pull a member (transmitting member) for transmitting a driving force such as the cable C into the headrest 30, as in the sheet structure of the related art, and hence the wiring length of the transmitting member may be further shortened. As a result, the transmitting member may be easily pulled (wired) inside the vehicle seat S1, and hence the vehicle seat S1 has satisfactory assembling workability.

OTHER EMBODIMENTS

In the above-described embodiment, the vehicle seat S1 has been described as an example of the conveyance seat of the present invention. However, the above-described embodiment is used to help the understanding of the present invention, and does not limit the present invention. The present invention may be modified and improved without departing from the spirit thereof, and the equivalent thereof is, of course, included in the present invention. Further, the above-described material or shape is merely an example for exhibiting the effect of the present invention, and does not limit the present invention.

Further, in the above-described embodiment, the vehicle seat S1 has been described which is stored in a manner such that the seatback 20 is folded forward along with the operation of flipping up the seat cushion 10 and the headrest 30 is folded forward by about 90°. However, the present invention is not limited thereto, and a vehicle seat with another configuration may be considered.

As an example of another configuration, a vehicle seat is considered which is folded in a manner such that the seatback 20 is folded forward to overlap the seat cushion 10 in a bent state without flipping up the seat cushion 10 and the headrest 30 is folded forward by about 90°. The present invention may be also applied to such a vehicle seat. That is, the present invention may be applied to the vehicle seat which is stored by folding the headrest 30 forward along with the movement of at least one of the seat cushion 10 and the seatback 20 to the storing position.

Specifically, as the configuration of the vehicle seat, there is a configuration in which the second driving portion 150 drives the headrest rotating mechanism 50 to perform the operation for folding the headrest 30 along with the movement of at least one of the seat cushion 10 and the seatback 20 to the storing position when the receiving portion such as the storing operation belt shaped member ST2 receives the storing operation performed by the passenger as in the above-described embodiment.

The present invention may be applied to such a configuration.

Further, in the above-described embodiment, the headrest rotating mechanism 50 and the arranging unit 80 respectively include individual casings 51 and 81, and the attachment positions of the respective casings 51 and 81 to the seatback frame 21 are set to be different from each other. However, the present invention is not limited thereto, and the attachment position of the casing 51 of the headrest rotating mechanism 50 and the attachment position of the casing 81 of the arranging unit 80 may be the same position. In other words, the bolt receiving portion 51a provided in the casing 51 of the headrest rotating mechanism 50 and the bolt receiving portion 81a provided in the casing 81 of the arranging unit 80 may receive the same stud bolt Bs to be simultaneously fixed by the stud bolt Bs.

Further, a configuration may be employed in which the headrest rotating mechanism 50 and the arranging unit 80 share the casing (that is, the casing 51 of the headrest rotating mechanism 50 and the casing 81 of the arranging unit 80 are integrated with each other).

Further, in the above-described embodiment, the belt shaped member ST1 is provided as a member that receives the operation performed by the passenger to independently fold only the headrest 30 forward, and the passenger performs the operation of pulling the belt shaped member ST1 as the operation. However, the present invention is not limited thereto. The operation may be received by another type as long as the headrest rotating mechanism 50 is driven (specifically, as long as the slide member 54 is slid) by using the operation performed by the passenger to independently fold the headrest 30 forward. For example, a press-type button may be provided in the seatback 20. In a case of such a press-type button, the structure becomes more complex than that of the belt shaped member ST1. However, since the press-type button does not extend from the seatback 20 as in the belt shaped member ST1, the press-type button has a better outer shape compared to the belt shaped member ST1.

REFERENCE NUMERALS 1 vehicle, 2 vehicle body floor, 3 luggage compartment part
10 seat cushion, 10a projection portion
11 cushion frame
20 seatback, 20a pedestal portion, 20b rotation shaft
21 seatback frame
22 pan frame, 22a cable returning wall
23 pipe frame, 24 hooking rod
25 pillar folding regulating portion, 26 reinforcing plate
27 attachment bracket, 28 abutting member
30 headrest
31 inner frame, 31a leg portion, 31b lower end flange portion
32 guide, 32a lower end flange
33 pillar, 33a vertical portion, 33b horizontal portion
33c pillar side engagement portion, 33d notch
40 armrest
50 headrest rotating mechanism
51 casing, 51a bolt receiving portion
52 biasing spring, 53 locking member
54 slide member, 54a one longitudinal end
54b extension portion
60 seat cushion flip-up mechanism
70 seatback folding mechanism, 71 biasing spring
71a one end, 71b other end
72 locking mechanism, 73 locking piece, 74 striker
75 base portion, 76 connection portion, 76a lower end
76b upper end
77 operation unit, 77a operation cover, 77b operation lever
77c connecting rod
80 arranging unit
81 casing, 81a bolt receiving portion, 81b guide slit
81c center region, 81d outer region, 82 rotation shaft
83 first rotating member, 83a cable locking portion, 83b tongue shaped portion
83c tongue shaped engagement portion, 83d protrusion portion, 83e circular-arc hole
84 second rotating member, 84a guide hole, 84b convex portion
84c protrusion portion, 84d outermost edge, 84e connection hole
85 third rotating member, 85a rotation shaft
86 engagement pin, 87 cushioning rubber, 87a support shaft
88a first coil spring, 88b second coil spring
88c third coil spring
90 seatback supporting unit, 91 locking pin
100 striker locking mechanism
101 locking portion, 102 locking piece, 103 housing
104 connection piece, 105 striker
110 attachment unit, 111 attachment plate
112 first plate portion, 112a upright wall portion
112b slit, 112c path defining portion
113 second plate portion, 114 attachment hole
114a front end, 114b center portion, 114c rear end
115 submarine bracket
120 movable unit, 121 link
121a abutting portion, 121b insertion hole
122 pipe rod, 123 connection bar
124 attachment bracket, 125 support mechanism
126A, 126B rotation shaft, 127 base bracket
127a upright wall portion
128 spiral spring, 129 damper rubber
130 folding angle detecting mechanism
140 first driving portion, 150 second driving portion
AS wiring space, Bo bolt, Bs stud bolt
C cable
C1 first cable, C2 second cable
C3 third cable, C4 fourth cable
S1, S11, S12 vehicle seat
ST1 belt shaped member, ST2 storing operation belt shaped member, Ws washer

The invention claimed is:
1. A conveyance seat comprising:
a seat cushion;
a seatback including a seatback frame therein; and
a forward foldable headrest;

the conveyance seat being stored by moving at least one of the seat cushion and the seatback to a storing position and folding the headrest forward;

the conveyance seat further comprising:
- a folding mechanism that performs a folding operation for folding the headrest forward;
- a first operating portion that is operable for folding only the headrest forward and is movably connected to the folding mechanism;
- a second operating portion that is operable for storing the conveyance seat;
- a first driving portion that drives only the folding mechanism by the first operating portion being operated to permit the folding mechanism to perform the folding operation; and
- a second driving portion that is movably connected to the second operating portion and drives the folding mechanism along with a movement of at least the one of the seat cushion and the seatback to a storing position to permit the folding mechanism to perform the folding operation when the second operating portion is operated, wherein:
the folding mechanism, the first driving portion, and the second driving portion are all attached to the seatback frame;
the folding mechanism comprises:
- a pillar that supports the headrest;
- a support portion that supports the pillar to be rotatable in a front to back direction;
- a biasing member that biases the pillar forward;
- a locking member that engages with the pillar to hold the pillar in a standing state against a biasing force of the biasing member; and
- a slide member that slides to release an engagement state between the locking member and the pillar, the first driving portion includes a fastening portion that is formed in the slide member to fasten the first operating portion and the slide member to each other;
a movement mechanism is further provided which performs a movement operation for moving at least the one of the seat cushion and the seatback to the storing position by the second operating portion being operated;
the second driving portion includes a connection portion that is formed in the slide member to connect the movement mechanism and the slide member to each other; and
the fastening portion is located near the first operating portion in relation to the connection portion.

2. The conveyance seat according to claim 1, further comprising:
a casing which accommodates the slide member,
wherein:
a plate shaped pan frame and a pipe frame attached along an outer edge of the pan frame and located at a front side of the pan frame are provided in the seatback frame; and
the casing is attached to a front surface of the pan frame and is located between a rear end of the pan frame and a front end of the pipe frame in the front to back direction of the seatback frame.

3. The conveyance seat according to claim 2, wherein:
the slide member slides in a width direction of the seatback;
the first operating portion is a belt shaped member that extends from an upper end surface of the seatback;
only the headrest is folded by a pulling operation that pulls the belt shaped member along a height direction of the seatback intersecting the width direction;
the first driving portion includes a converting portion that is interactively interfaced with the slide member and that converts the pulling operation along the height direction into a sliding movement of the slide member along the width direction; and
the converting portion is a bending member that is attached to the seatback frame and abuts against the belt shaped member to bend the belt shaped member.

4. The conveyance seat according to claim 3, wherein the bending member abuts against the belt shaped member so that the belt shaped member is bent at a front side in relation to a front end of the pipe member in the front to back direction.

5. The conveyance seat according to claim 4, wherein:
the conveyance seat is a vehicle seat mounted on a vehicle; and
the belt shaped member extends from a portion in the upper end surface of the seatback located at an outside of the vehicle in relation to the headrest in the width direction.

* * * * *